United States Patent
Luo et al.

(10) Patent No.: US 9,674,802 B2
(45) Date of Patent: Jun. 6, 2017

(54) SECONDARY SYNCHRONIZATION CODEBOOK FOR E-UTRAN

(75) Inventors: Tao Luo, San Diego, CA (US); Peter Gaal, San Diego, CA (US); Ke Liu, San Diego, CA (US); Arun Kannu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/214,602

(22) Filed: Aug. 22, 2011

(65) Prior Publication Data
US 2011/0305237 A1 Dec. 15, 2011

Related U.S. Application Data

(62) Division of application No. 12/166,495, filed on Jul. 2, 2008, now Pat. No. 8,009,701.
(Continued)

(51) Int. Cl.
| | |
|---|---|
| *H04J 11/00* | (2006.01) |
| *H04W 56/00* | (2009.01) |
| *H04L 27/26* | (2006.01) |
| *H04J 13/00* | (2011.01) |
| *H04L 5/00* | (2006.01) |

(52) U.S. Cl.
CPC ....... *H04W 56/001* (2013.01); *H04J 11/0069* (2013.01); *H04J 11/0073* (2013.01); *H04J 11/0076* (2013.01); *H04J 13/0003* (2013.01); *H04L 27/2613* (2013.01);
(Continued)

(58) Field of Classification Search
USPC ................ 370/320, 335, 342, 349, 350, 441
See application file for complete search history.

(56) References Cited

U.S. PATENT DOCUMENTS 5,818,344 A * 10/1998 Sharpe ......................... 340/7.43
6,301,268 B1 10/2001 Laroia et al.
(Continued)

FOREIGN PATENT DOCUMENTS

| | | |
|---|---|---|
| EP | 1343265 A1 | 9/2003 |
| JP | H11331122 A | 11/1999 |

(Continued)

OTHER PUBLICATIONS

International Search Report & Written Opinion—PCT/US2008/072904, International Search Authority—European Patent Office—Jul. 2, 2009.
(Continued)

*Primary Examiner* — Brenda H Pham
(74) *Attorney, Agent, or Firm* — Peng Zhu

(57) ABSTRACT

Providing for secondary synchronization encoding utilizing a primary synchronization channel (P-SCH)-related scrambling code is described herein. Scrambled secondary synchronization codes (SSCs) can be assigned to multiple base stations of a radio access network (RAN). By way of example, PSC-based scrambling codes can be created from a plurality of M-sequences generated from a common polynomial expression. Further, an SSC codebook is provided that selects sequence pairs of a sequence matrix for generating SSCs. Selection can be based on transmission characteristics of resulting SSCs, providing reduced interference in planned, semi-planned and/or unplanned mobile deployments.

21 Claims, 13 Drawing Sheets

Related U.S. Application Data

(60) Provisional application No. 60/955,623, filed on Aug. 13, 2007.

(52) U.S. Cl.
CPC .................. *H04J 2011/0096* (2013.01); *H04J 2013/0096* (2013.01); *H04L 5/0053* (2013.01); *H04L 27/2626* (2013.01)

(56) References Cited

U.S. PATENT DOCUMENTS

| | | | |
|---|---|---|---|
| 6,480,503 | B1 | 11/2002 | Yamaguchi et al. |
| 6,682,275 | B1 | 1/2004 | Lindblom et al. |
| 6,728,297 | B2* | 4/2004 | Rudolf ........................... 375/145 |
| 7,039,036 | B1 | 5/2006 | Dabak et al. |
| 7,061,966 | B2 | 6/2006 | Storm et al. |
| 7,158,505 | B2 | 1/2007 | Dick et al. |
| 7,187,707 | B2* | 3/2007 | Ho et al. ....................... 375/145 |
| 8,009,701 | B2* | 8/2011 | Luo et al. ...................... 370/503 |
| 2007/0133390 | A1 | 6/2007 | Luo et al. |
| 2008/0273522 | A1 | 11/2008 | Luo et al. |
| 2009/0136037 | A1 | 5/2009 | Haga et al. |
| 2010/0135257 | A1 | 6/2010 | Higuchi et al. |
| 2016/0249306 | A1 | 8/2016 | Luo et al. |

FOREIGN PATENT DOCUMENTS

| | | |
|---|---|---|
| JP | 2003533148 A | 11/2003 |
| JP | 2004525531 A | 8/2004 |
| JP | 2009027211 A | 2/2009 |
| JP | 2010531610 A | 9/2010 |
| RU | 2242091 C2 | 12/2004 |
| WO | WO0126269 | 4/2001 |
| WO | 0186990 A1 | 11/2001 |
| WO | 0213548 A2 | 2/2002 |
| WO | 2007020710 A1 | 2/2007 |
| WO | 2008057752 A2 | 5/2008 |
| WO | 2009008623 A2 | 1/2009 |

OTHER PUBLICATIONS

LG Electronics: "Secondary-Synchronization Channel Design" 3GPP Draft; R1-072328_LGE-SSCH Design_Draft, 3rd Generation Partnership Project (3GPP), Mobile Competence Centre ; 650, Route Des Lucioles ; F-06921 . Sophia-Antipolis Cedex ; France, vol. RAN WG1, no. Kobe, Japan; May 2, 2007, XP050106058 p. 1, line 1—p. 2, line 12 p. 6, line 1—line 9 figures 1,2.

NEC Group: Package of PSC and SSC proposals for LTE cell search 3GPP Draft; R1-071497, 3rd Generation Partnership Project (3GPP), Mobile Competence Centre ; 650, Route Des Lucioles ; F-06921 Sophia-Antipolis Cedex ; France, vol. RAN WG1, no St Julian; Mar. 26, 2007, Mar. 21, 2007, XP050105430 p. 6, line 10—p. 9, line 17.

Nystrom J et al: "Comparison of cell search methods for asynchronous wideband CDMA cellular system" Universal Personal Communications, 1998. ICUPC '98. IEEE 1998 Internat ional Conference on Florence, Italy Oct. 5-9, 1998, New York, NY, USA,IEEE, US, vol. 2, Oct. 5, 1998, pp. 783-787, XP010315020 ISBN: 978-0-7803-5106-6 p. 784, col. 2, line 4—p. 785, col. 1, line 29.

Qualcomm Europe: Details on SSC sequence design 3GPP Draft; R1-072093, Srd Generation Partnership Project (3GPP), Mobile Competence Centre ; 650, Route Des Lucioles ; F-06921 Sophia-Antipolis Cedex ; France, vol. tsg_ranWGl_RLlTSGRI_49Docs, no Kobe, Japan; May 7, 2007, May 1, 2007, XP050105847 the whole document.

Qualcomm Europe: "SCH design considerations for WCDMA (LCR) based E-UTRA downlink" 3GPP TSG-RAN WG1 #43, Seoul, Korea, [Online] No. rl-051495, Nov. 7, 2005, pp. 1-9, XP002495525 Retrieved from the Internet: URL:www.3gpp.org/ftp/TSG_RAN/WGl_RLl/TSGRI_43/Docs/RI-051495.zip> [retrieved on Sep. 12, 2008] p. 5, line 5—p. 6, line 4.

"Satellite Earth Stations and Systems (SES); Satellite Component of UMTS/IMT2000; G-family Part 3: Spreading and modulation (S-UMTS-A 25.213); ETSI TS 101 851-3" ETSI Standards, LIS, Sophia Antipolis Cedex, France, vol. SES-S-UMTS, No. VI.2.1, Jan. 1, 2006, XP014032291 ISSN: 0000-0001 paragraph 5.2.

"S-SCH sequence design" 3GPP Draft; R1-071027, 3rd Generation Partnership Project (3GPP), Mobile Competence Centre ; 650, Route Des Lucioles ; F-06921 Sophia-Antipolis Cedex ; France, vol. RAN WG1, no. St. Louis, USA; Feb. 12, 2007, Feb. 6, 2007, XP050105026 figures 1,2 p. 1, line 1—p. 5, line 4 p. 7, line 10—line 18.

NTT DoCoMo, KDDI, Mitsubishi Electric, Sharp: "Scrambling Method for S-SCH in E-UTRA Downlink", 3GPP TSG RAN WG1 Meeting #49bis R1-072940, Jun. 25, 2007, pp. 1-4.

Taiwan Search Report'TW097130836—TIPO—Jul. 24, 2012.

Nagata S., et al., "Investigation of Synchronization Channel Sequences in OFDM Based Evolved UTRA Downlink", Technical Report of the Institute of Electronics, Information and Communication Engineers, Japan, IEICE, Jul. 12, 2007, vol. 107, No. 147, pp. 119-124, RCS2007-49.

Ericsson, "Secondary Synchronization Signal Design," 3GPP TSG-RAN WG 1 #48-BIS, R1-071584, Mar. 26-30, 2007, MALTA. pp. 1-7, Internet Reference XP002503944.

European Search Report—EP14195126—Search Authority—Munich—Mar. 23, 2015.

Qualcomm Europe: "Details on SSC Sequence Design," 3GPP Draft; R1-072727, 3rd Generation Partnership Project (3GPP), Mobile Competence Project (3GPP), Mobile Competence Centre; 650, Route Des Lucioles; F-06921 Sophia-Antipolis Cedex; France, vol. RAN WG1, No. Orlando, USA; Jun. 20, 2007, Jun. 20, 2007 (Jun. 20, 2007), XP050106414, the whole document.

Taiwan Search Report—TW102114699—TIPO—Dec. 22, 2014.

3GPP TS 3621 1, V1.2.0, 3rd Generation Partnership Project; Technical Specification Group Radio Access Network; Physical Channels and Modulation (Release 8), Jun. 2007.

3GPP TS 36.211: "3rd Generation Partnership Project; Technical Specification Group Radio Access Network; Evolved Universal Terrestrial Radio Access (E-UTRA); Physical Channels and Modulation", V2.0.0, Release 8, Sep. 2007, p. 45.

3GPP TS 36.211 V8.1.0, 3rd Generation Partnership Project; Technical Specification Group Radio Access Network; Evolved Universal Terrestrial Radio Access (E-UTRA); Physical channels and modulation (Release 8), (Nov. 2007), pp. 1-64.

Fujitsu: "Views on SCH Structure", 3GPP TSG-RAN WG1#47, R1-063342, Nov. 2006, pp. 1-4, URL: http://www.3gpp.org/ftp/tsg_ran/WG1_RL1/TSGR1_47/Docs/R1-063342.zip.

NEC Group: S-SCH for LTE cell search[online], 3GPP TSG-RAN WG1#49b R1-072819, Jun. 2007.

NTT DoCoMo: "S-SCH Structure for E-UTRA Downlink[online]," Mitsubishi Electric, Toshiba Corporation 3GPP TSG-RAN WG1#49b R1-072941.

QUALCOMM Europe: "Details for SSC Specification[online]," 3GPP TSG-RAN WG1#50b R1-073925, Oct. 2007.

LG Electronics: "S-SCH Sequence Design for E-UTRA", 3GPP TSG-RAN WG1#47, R1-063165, URL: http://www.3gpp.org/ftp/tsg_ran/WG1_RL1/TSGR1_47/Docs/R1-063165.zip, Nov. 6, 2006, pp. 1-10.

\* cited by examiner

SECONDARY SYNCHRONIZATION CODEBOOK FOR E-UTRAN

CROSS REFERENCE TO RELATED APPLICATION

The present Application is a divisional of U.S. patent application Ser. No. 12/166,495, entitled "SECONDARY SYNCHRONIZATION CODEBOOK FOR E-UTRAN", filed Jul. 2, 2008, pending, which claims priority to Provisional Patent Application No. 60/955,623, entitled "SECONDARY SYNCHRONIZATION CODEBOOK FOR E-UTRAN", filed on Aug. 13, 2007, assigned to the assignee hereof and hereby expressly incorporated by reference herein in their entirety.

BACKGROUND

I. Field

The following relates generally to wireless communication, and more specifically to determining a secondary synchronization codebook for selecting secondary synchronization codes for a radio network site.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if additional dimensionalities created by the multiple transmit and receive antennas are utilized.

Improved performance, throughput and reliability provided by multi-transmission wireless access sites can also introduce additional system complexities. For instance, where multiple base stations are transmitting within a common area, and such transmissions are received by a single device, a mechanism to distinguish between such transmissions can be required. Further, a means to distinguish and/or identify one base station from another can be required. One mechanism for identifying a base station(s) and distinguishing received transmissions is by employing channel synchronization. Synchronization can include, in some instances, a primary synchronization code (PSC) that includes frequency and timing information for a transmission, and a secondary synchronization code (SSC) that provides base station identity. In such instances, a device can distinguish and decode one or more transmissions in a multi-transmitter environment by way of the PSC and/or SSC.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure, in at least some aspects, employs a primary synchronization channel (P-SCH) related scrambling code to scramble secondary synchronization codes (SSCs) of multiple base stations. In addition, various mechanisms are provided to accomplish the scrambling. In at least one additional aspect, PSC-based scrambling codes are created from a plurality of M-sequences generated from a polynomial that is different from a polynomial utilized to generate an SSC. Furthermore, disclosed is an SSC codebook that selects sequence pairs to generate SSCs for multi-transmitter mobile sites based on power and/or correlation characteristics of the resulting scrambled SSCs. As a result, interference between multi-transmitter SSC transmissions received at a device can be mitigated, providing improved throughput, reliability and consistency for planned, semi-planned and unplanned mobile base station deployments.

According to some aspects, disclosed is a method for generating a secondary synchronization code (SSC) for wireless communication. The method can comprise generating a sequence matrix from a base M-sequence and cyclic shifted variations of the base M-sequence and scrambling at least one M-sequence of the sequence matrix with a common binary scrambling code based on a primary synchronization code (PSC) associated with the wireless communication. Furthermore, the method can comprise generating an SSC from the at least one scrambled M-sequence and mapping the SSC onto sub-carrier channels of an orthogonal frequency division multiplex (OFDM) transmission.

According to other aspects, provided is an apparatus for generating an SSC for wireless communication. The apparatus can comprise a logic processor that generates a sequence matrix from a base M-sequence and cyclic shifted variations of the base M-sequence and a data transformation module that scrambles at least one sequence of the matrix with a common binary scrambling code based on a PSC associated with the wireless communication. In addition, the apparatus can comprise a multiplexing module that generates an SSC from the at least one scrambled sequence and a transmission processor that maps the SSC onto sub-carrier channels of an OFDM transmission.

According to still other aspects, disclosed is a further apparatus for generating an SSC for wireless communication. The apparatus can comprise means for generating a sequence matrix from a base M-sequence and cyclic shifted variations of the base M-sequence and means for scrambling at least one sequence of the matrix with a common binary scrambling code based on a PSC associated with the wireless communication. In addition, the apparatus can comprise means for generating an SSC from the at least one scrambled sequence and means for mapping the SSC onto sub-carrier channels of an OFDM transmission.

In additional aspects of the subject disclosure, provided is a processor configured to generate an SSC for wireless communication. The processor can comprise a first module that generates a sequence matrix from a base M-sequence and cyclic shifted variations of the base M-sequence and a second module that scrambles at least one sequence of the matrix with a common binary scrambling code based on a PSC associated with the wireless communication. The processor can further comprise a third module that generates an SSC from the at least one scrambled sequence and a fourth module that maps the SSC onto sub-carrier channels of an OFDM transmission.

According to at least one further aspect, providing is a computer-readable medium comprising computer-readable instructions configured to generate an SSC for wireless communication. The instructions can be executable by at least one computer to generate a sequence matrix from a base M-sequence and cyclic shifted variations of the base M-sequence and to scramble at least one sequence of the matrix with a common binary scrambling code based on a PSC associated with the wireless communication. Furthermore, the instructions can be executable by at least one computer to generate an SSC from the at least one scrambled sequence and to map the SSC onto sub-carrier channels of an OFDM transmission.

According to some aspects, disclosed is a method of selecting distinct SSCs for a radio network site. The method can comprise forming a sequence matrix from a base M-sequence and n cyclic shifted sequences of the base M-sequence and assigning one of substantially $(n+1)^2$ indices to distinct sequence pairs of the sequence matrix. The method can also comprise selecting a sequence pair based at least in part on peak to average power ratio (PAPR) or signal correlation of an SSC resulting from the sequence pair.

In addition, according to other aspects, provided is an apparatus that selects distinct SSCs for a radio network site. The apparatus can comprise a logic processor that forms a sequence matrix from a base M-sequence and n cyclic shifted sequences of the base M-sequence and an indexing module that assigns one of substantially $(n+1)^2$ indices to distinct sequence pairs of the sequence matrix. According to some aspect, the apparatus can also comprise a pruning module that selects a sequence pair based at least in part on PAPR or signal correlation of an SSC resulting from the sequence pair.

In one or more additional aspects, disclosed is an apparatus that selects distinct SSCs for a radio network site. The apparatus can comprise means for forming a sequence matrix from a base M-sequence and n cyclic shifted sequences of the base M-sequence and means for assigning one of substantially $(n+1)^2$ indices to distinct sequence pairs of the sequence matrix. Furthermore, the apparatus can comprise means for selecting a sequence pair based at least in part on PAPR or signal correlation of an SSC resulting from the sequence pair.

According to at least one other aspect, disclosed is a processor configured to select distinct SSCs for a radio network site. The processor can comprise a first module that forms a sequence matrix from a base M-sequence and n cyclic shifted sequences of the base M-sequence and a second module that assigns one of substantially $(n+1)^2$ indices to distinct sequence pairs of the sequence matrix. Additionally, the processor can comprise a third module that selects a sequence pair based at least in part on PAPR or signal correlation of an SSC resulting from the sequence pair.

In addition to the foregoing, provided is a computer-readable medium comprising computer-readable instructions configured to select distinct SSCs for a radio network site. The instructions can be executable by at least one computer to form a sequence matrix from a base M-sequence and n cyclic shifted sequences of the base M-sequence and to assign one of substantially $(n+1)^2$ indices to distinct sequence pairs of the sequence matrix. Furthermore, the instructions can be executable by at least one computer to select a sequence pair based at least in part on PAPR or signal correlation of an SSC resulting from the sequence pair.

According to additional aspects, disclosed is a method of wireless communication. The method can comprise receiving wireless transmission from a mobile network transmitter and extracting an SSC from the wireless transmission, the SSC is comprised of at least two sequences scrambled with a common PSC-based binary scrambling code. The method can further comprise employing a common PSC-based binary descrambling code to decipher the SSC and determining an identity of the mobile network transmitter from the deciphered SSC.

In accordance with other aspects, provided is an apparatus for conducting wireless communication. The apparatus can include an antenna that receives wireless transmission from a mobile network transmitter and a demodulator that extracts an SSC from the wireless transmission, the SSC is comprised of at least two sequences scrambled with a common PSC-based binary scrambling code. Furthermore, the apparatus can include a signal processor that employs a common PSC-based binary descrambling code to decipher the SSC and a logic processor that determines an identity of the mobile network transmitter from the deciphered SSC.

In accordance with still other aspects, disclosed is an apparatus that conducts wireless communication. The apparatus can comprise means for receiving wireless transmission from a mobile network transmitter and means for extracting an SSC from the wireless transmission, the SSC is comprised of at least two sequences scrambled with a common PSC-based binary scrambling code. Further, the apparatus can comprise means for employing a common PSC-based binary descrambling code to decipher the SSC and means for determining an identity of the mobile network transmitter from the deciphered SSC.

In additional aspects, provided is a processor configured to conduct wireless communication. The processor can comprise a first module that receives wireless transmission from a mobile network transmitter and a second module that extracts an SSC from the wireless transmission, the SSC is comprised of at least two sequences scrambled with a common PSC-based binary scrambling code. The processor can further comprise a third module that employs a common PSC-based binary descrambling code to decipher the SSC and a fourth module that determines an identity of the mobile network transmitter from the deciphered SSC.

According to one or more further aspects, provided is a computer-readable medium comprising computer-readable instructions configured to conduct wireless communication. The instructions can be executable by at least one computer to receive wireless transmission from a mobile network transmitter and to extract an SSC from the wireless transmission, the SSC is comprised of at least two sequences scrambled with a common PSC-based binary scrambling code. The instructions can further be executable by at least one computer to employ a common PSC-based binary descrambling code to decipher the SSC and to determine an identity of the mobile network transmitter from the deciphered SSC.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

BRIEF DESCRIPTION OF THE DRAWINGS

FIG. 4 illustrates a diagram of an example sequence matrix for generating sequences for SSCs, scrambling codes, and/or the like.

DETAILED DESCRIPTION

Figure 1:
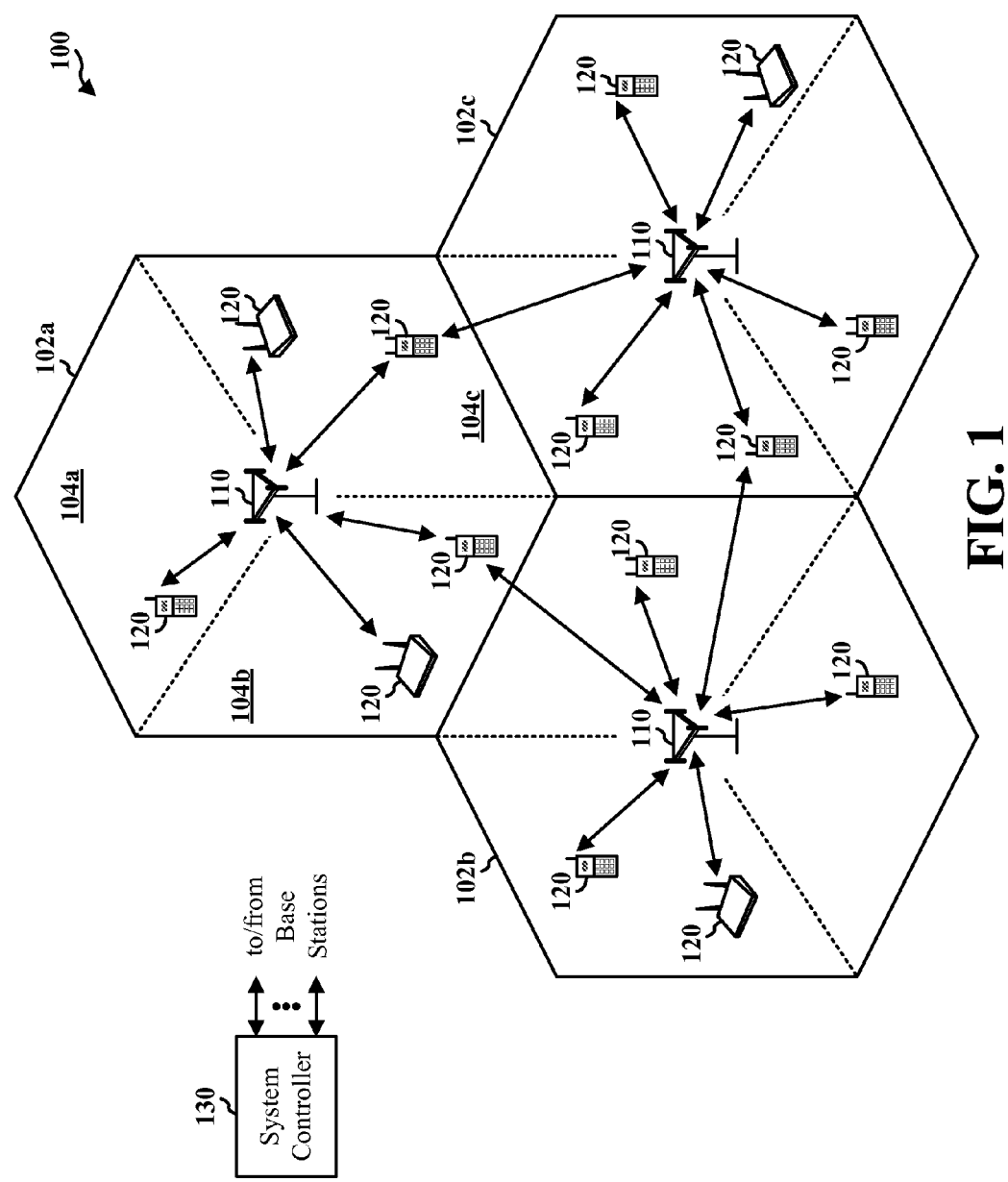
FIG. 1 depicts a block diagram of an example system that provides wireless communication in accordance with aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are descried in the context of determining characteristics of one or more wireless channels and providing a handover determination based in part on magnitudes of the determined characteristics. One skilled in the art should appreciate that similar techniques could apply to other communication environments.

The subject disclosure provides, in one or more aspects, reduced interference for multiple secondary synchronization code (SSC) transmission in a multi-transmitter environment. The environment can be associated with a planned, semi-planned, and/or unplanned mobile communication environment. Typically, radio access network (RAN) base stations (BSs) employ synchronization codes to facilitate over the air (OTA) communication with mobile devices (e.g., cellular telephones, cellular-enabled laptops, multi-mode phones, personal digital assistants [PDAs], and/or the like). Mobile devices monitor the synchronization codes (and other portions of OTA transmissions in some instances) in order to determine when pertinent data is being provided by a BS. Where many BSs exist within a relatively small communication site (e.g., such that a mobile device receives wireless transmission from many BSs), the synchronization codes can interfere with each other, becoming difficult to distinguish at the mobile device. Accordingly, mechanisms to mitigate or avoid synchronization code interference can improve reliability of mobile communications.

According to some aspects, particular mechanisms are provided to generate and scramble an SSC with a P-SCH related scrambling code. Scrambled SSCs can be less likely to interfere with each other when transmitted in a common mobile environment (e.g., a single mobile deployment site, or multiple closely positioned mobile sites). In at least one aspect, SSCs can be generated from a first set of sequences provided by a first mathematical expression, and scrambling codes to scramble the SSCs can be generated from a different mathematical expression. Further, sequence indexes of the scrambling codes can be selected based on a primary synchronization channel (P-SCH). Various mechanisms can be employed to generate the scrambled SSCs and reduce interference of multiple SSCs transmitted by multiple sources (e.g., BSs).

SSCs can be generated from multiple sequences selected from a sequence matrix, comprising a base sequence and variations of the base sequence (e.g., cyclic shifted sequences). The base sequence, selected sequences and/or SSC can be scrambled with a scrambling code(s) to reduce interference of OTA SSCs. As one example, a pair of selected sequences can first be scrambled by the scrambling code(s), the sequences can then be combined to form a full-length scrambled SSC sequence (e.g., by interleaving the sequence pair), which can be mapped to an OTA message. In another example, the pair of sequences can first be interleaved to form an unscrambled full-length sequence and then scrambled by the scrambling code(s), then mapped to the transmission. In other examples, the base sequence can be scrambled such that the sequence matrix comprises the scrambled base sequence and scrambled variations thereof In such example, a pair of scrambled sequences can be selected from the matrix, interleaved to form a full-length SSC sequence, and mapped into the OTA message. The scrambled SSC sequences can yield reduced interference of transmitted SSCs and improve transmission reliability for planned, semi-planned or unplanned mobile base station deployment.

According to one or more other aspects, a mechanism to generate PSC-based scrambling codes is provided that can randomize interference between encoded signals. Multiple sequences (e.g., three sequences) are employed to generate a scrambling code for one or more SSCs. The multiple sequences can comprise a set of full-length sequences (or, e.g., modified full-length sequences, such as one-bit truncated), or a set of half-length sequences appended to other half-length sequences of such a set. In at least one aspect, the set of full-length and/or half-length sequences are generated from a common M-sequence polynomial. In another aspect, the set of full-length and/or half-length sequences can be generated from a plurality of M-sequence polynomials. In at least one additional aspect, PSC-based scrambling codes are created from three half-length M-sequences generated from a polynomial that is different from a polynomial utilized to generate an SSC.

In accordance with one or more other aspects, provided is an SSC codebook for generating SSCs for a multi-transmitter mobile site. The SSCs can be generated from various sequences of a sequence matrix. The sequences can be selected based on PAPR and/or correlation determinations of SSCs that result from a pair of sequences. Thus, the resulting SSCs can exhibit improved transmission and reduced interference because of such aspects of the subject disclosure.

As used in the subject disclosure, the terms "component," "system," and the like are intended to refer to a computer-related entity, either hardware, software, software in execution, firmware, middle ware, microcode, and/or any combination thereof. For example, a component can be, but is not limited to being, a process running on a processor, a processor, an object, an executable, a thread of execution, a program, and/or a computer. One or more components can reside within a process and/or thread of execution and a component can be localized on one computer and/or distributed between two or more computers. Further, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein can be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a mobile communication device (or, e.g., a mobile device). A mobile communication device can also be called a system, a subscriber unit, a subscriber station, mobile station, mobile, remote station, remote terminal, access terminal, user terminal, user agent, a user device, or user equipment. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described may be implemented in hardware, software, firmware, middleware, microcode, or any suitable combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine-readable medium and/or computer readable medium, which can be incorporated into a computer program product. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, FIG. 1 illustrates a wireless communication system 100 with multiple base stations 110 and multiple terminals 120, such as can be utilized in conjunction with one or more aspects. A base station (110) is generally a fixed station that communicates with the terminals and can also be called an access point, a Node B, or some other terminology. Each base station 110 provides communication coverage for a particular geographic area or coverage area, illustrated as three geographic areas in FIG. 1, labeled 102a, 102b, and 102c. The term "cell" can refer to a base station and/or its coverage area depending on the context in which the term is used. To improve system capacity, a base station geographic area/coverage area can be partitioned into multiple smaller areas (e.g., three smaller areas, according to cell 102a in FIG. 1), 104a, 104b, and 104c. Each smaller area (104a, 104b, 104c) can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the following description, unless specified otherwise, the term "base station" is used generically for a fixed station that serves a sector as well as a fixed station that serves a cell.

Terminals 120 are typically dispersed throughout the system, and each terminal can be fixed or mobile. A terminal can also be called a mobile station, user equipment, a user device, or some other terminology. A terminal can be a wireless device, a cellular phone, a personal digital assistant (PDA), a wireless modem card, and so on. Each terminal 120 can communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 can communicate with one another as needed. Data transmission on the forward link often occurs from one access point to one access terminal at or near the maximum data rate that can be supported by the forward link and/or the communication system. Additional channels of the forward link (e.g., control channel) can be transmitted from multiple access points to one access terminal Reverse link data communication can occur from one access terminal to one or more access points.

Figure 2:
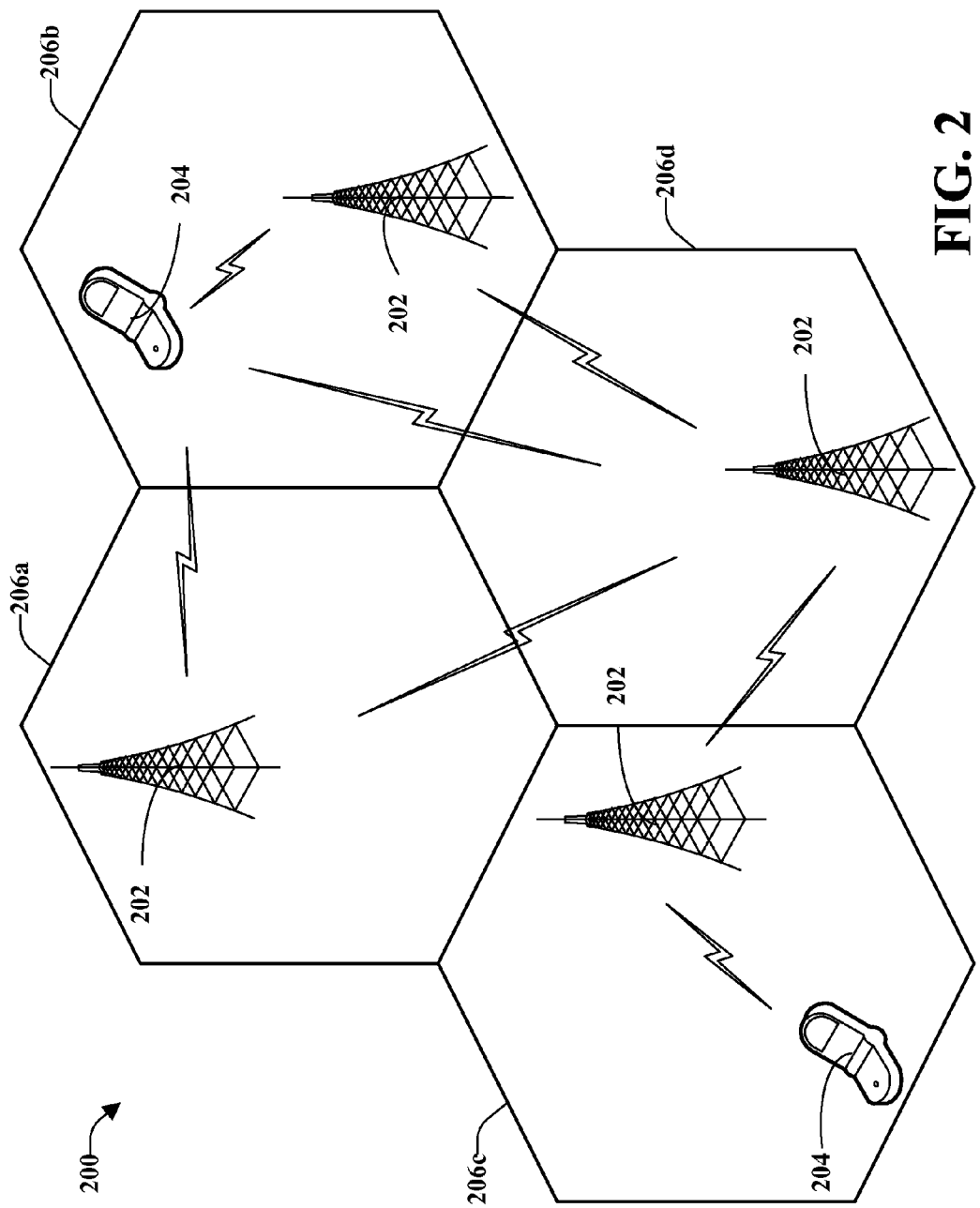
FIG. 2 illustrates a block diagram of an example communication apparatus for employment with a wireless communication environment.

FIG. 2 is an illustration of an ad hoc or unplanned/semi-planned wireless communication environment 200, in accordance with various aspects. System 200 can comprise one or more base stations 202 in one or more cells and/or sectors that receive, transmit, repeat, etc., wireless communication signals to each other and/or to one or more mobile devices 204. As illustrated, each base station 202 can provide communication coverage for a particular geographic area, illustrated as four geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to facilitate providing and/or utilizing synchronized OTA message transmission in a wireless communication environment (200), as set forth herein with regard to subsequent figures.

Figure 3:
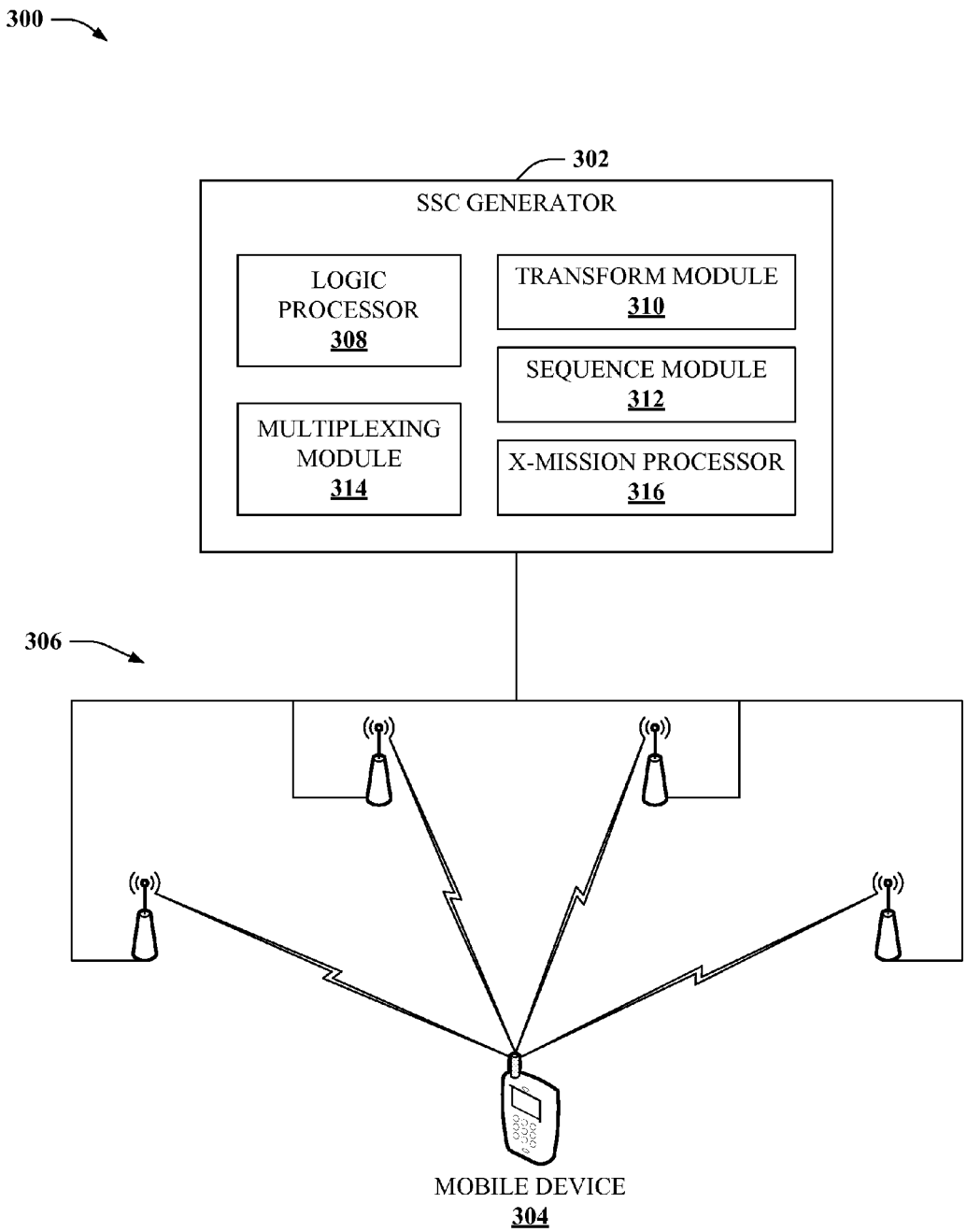
FIG. 3 depicts a block diagram of an example system that provides reduced interference among SSCs of a multi-base station site according to one or more aspects.

FIG. 3 is a block diagram of an example system 300 that provides reduced interference for synchronization messages in a mobile communication environment. A synchronization message as utilized in the context of system 300 can include an SSC. It should also be appreciated that aspects of a primary synchronization code (PSC), or of a P-SCH, can be employed to reduce interference of an SSC, as discussed herein. It should be further appreciated that a mobile communication environment pertinent to system 300 can include a third generation partnership project (3GPP) long term evolution (LTE), referred hereinafter collectively as LTE, system, an evolved universal mobile telecommunication system (UMTS) terrestrial radio access network (E-UTRAN) system, or a combination thereof or of the like. For instance, other suitable mobile communication architectures employing orthogonal frequency division multiple access (OFDMA) access technology, frequency division multiplexing (FDM), including e.g., orthogonal FDM (OFDM), coded OFDM (COFDM), and/or the like, are included in such a mobile communication environment. It should further be appreciated that one of skill in the art may determine appropriate mechanisms to apply the below techniques to other mobile communication environments, including code division multiple access (CDMA) environments (e.g., CDMA2000, 3GPP2, etc.), time division multiple access (TDMA) environments (e.g., TDMA), time division duplex (TDD) environments, or suitable combinations thereof (e.g., TD-CDMA, TD-SCDMA, UMTS-TDD, FDMA/TDMA/FDD, etc.).

System 300 can comprise an SSC generator 302 coupled to one or more base stations of a RAN 306 (e.g., an E-UTRAN). One or more devices 304 can be serviced by the RAN 306. The base stations (306) can communicate with the mobile device 304 by exchanging OTA messages there with. An OTA message sent to the mobile device(s) 304 typically include one or more synchronization messages to facilitate such communication. For instance, a PSC can be utilized to indicate where data is packed in the message, message length, synchronization frequency, or the like. An SSC can provide the prior information, as well as an identity of a transmitting base station 306. Thus, the SSC can be utilized by the mobile device 304 to distinguish one base station (306) from another (306) in a multi-transmitter site 306.

Where multiple OTA messages are transmitted by multiple base stations, at substantially concurrent times, interference between the messages can result. Interference with respect to synchronization information can lead to missed messages, increased power consumption at mobile device 304, and communication inefficiency. To mitigate occurrence of interference, SSC generator 302 can employ one or more scrambling codes to reduce likelihood that two SSCs will interfere with each other at a receiving device (304).

System 300 can further comprise a logic processor 308 that generates a sequence matrix utilized to create one or more SSCs for base stations of the RAN 306. For instance, a sequence, sequence pair, sequence triplet, etc., can be utilized to generate an SSC. In one aspect, pairs of length-31 sequences (e.g., binary sequences having 31 binary bits) are employed to generate 62 bit SSCs. The sequence pairs can be selected from the sequence matrix generated by logic processor 308. In one example, the sequence matrix can be generated from a single base M-sequence of length-31. Such a sequence can be derived from a suitable polynomial expression. In other aspects, logic processor 308 derives the base M-sequence from a different polynomial expression than that used by a data transformation module 310 (below) to generate sequences for SSC scrambling codes. As a particular example, the polynomial expression utilized to generate the base M-sequence can be of the form $x^5+x^2+1$ over GF(2), where GF(2) indicates a Galois Field that limits results of the expression to binary digits.

Once a base sequence is generated by the logic processor 308, variations of the base sequence can be formed to populate the sequence matrix. In some aspects, a number of variations are generated that is substantially equivalent to a number of digits of the base sequence. (E.g., if the base sequence comprises 31 digits, 29, 30, 31, or substantially similar number of variations are generated). The variations are combined with the base sequence to form the sequence matrix (e.g., where the first, second, third, etc., rows of the matrix comprise the base sequence, first variation, second variation, etc., respectively, and where the first, second, third, etc., columns of the matrix comprise the first, second, third, etc., digits of each sequence, respectively—e.g., see FIG. 4, supra).

Once the sequence matrix is defined, logic processor can select multiple sequences from the matrix that can be utilized to generate an SSC. As one example, a pair of length-31 sequences can be selected to form a length-62 SSC. Each such SSC can then be assigned to one or more base stations of the RAN 306, and can carry identifying information (e.g., base station ID) distinguishing such base stations from other base stations. As discussed in more detail at FIGS. 5 and 6, infra, the selection can be based on multiple factors, including, but not limited to, PAPR of a resulting SSC, or signal correlation, or a combination thereof or of the like. To reduce interference between SSCs transmitted by RAN 306, the SSCs can be scrambled by employing one or more scrambling sequences, such as a PSC-bases sequence, discussed below.

System 300 can further comprise a data transformation module 310 that scrambles at least one sequence of a sequence matrix with a common binary scrambling code. In at least one aspect, the scrambling code can be generated by a sequence module 312 that employs sequences derived from a common polynomial expression. The common polynomial expression and/or derived sequences can be based on a PSC associated with wireless communication (e.g., OTA message). As an example, indices derived from the PSC can be employed to select sequence pairs, sequence triplets, or the like (e.g., from a scrambling code sequence matrix), to generate the scrambling code. Selection of scrambling code sequences based on the PSC can provide reduced interference for OTA transmission of multiple SSCs.

It should be appreciated that the data transformation module 310 can employ the scrambling sequence to scramble a multiplexed SSC, components of an SSC (e.g., sequences of a sequence pair, triplet, etc., that form the SSC), or sequences of the sequence matrix itself. In one particular example, data transformation module 310 can scramble a base sequence utilized to generate a sequence matrix. Derivative sequences of the scrambled base sequence (e.g., cyclic shifted variations) utilized to form the sequence matrix are inherently scrambled as well. Accordingly, a sequence matrix can be formed of scrambled sequences (e.g., by employing the scrambled base sequence or variations thereof), unscrambled sequences (e.g., by employing the unscrambled base sequence and variations thereof), or both. A matrix of scrambled sequences can be selected by logic processor 308, interleaved by multiplexing module 314, and mapped to an OTA message by transmission processor 316, as discussed in more detail below.

In other examples, a scrambling code can be applied to one or more non-scrambled sequences selected from an unscrambled sequence matrix. For instance, data transformation module 310 can scramble multiple short sequences selected from such a matrix that are then interleaved by a multiplexing module 314 to form a full-length SSC sequence. As another example, multiplexing module 314 can interleave the short sequences first, and then provide the resulting full-length sequence to the data transformation module 312, which scrambles the full-length sequence. The scrambled sequence is then utilized as an SSC for one or more base stations (306).

Various types of scrambling codes, as known in the art or made known to one of skill in the art by way of the context provided herein, can be generated by sequence module 312. As mentioned above, sequence module 312 can generate various sequences (e.g., M-sequences) from a common polynomial expression, or different polynomial expressions. In at least one aspect, three length-63 M-sequence based scrambling codes are generated, where each length-63 sequence is truncated by one bit to form a scrambling code (or, e.g., one bit is changed to 0 and mapped to a DC tone of a wireless transmission). In another example, three length-31 M-sequence based scrambling codes are generated, and repetition is employed to generate three length-62 scrambling codes (e.g., where B is a length-31 sequence, repetition can be of the form [B, B]).

In at least one particular aspect, each of multiple scrambling code sequences can be formed from a single polynomial expression. In one aspect, the polynomial expression can be of the form $1+x^2+x^3+x^4+x^5$. A resulting scrambling code sequence can be represented by C(0,n). As a specific example of a suitable scrambling sequence, C(0,n) can denote the following M-sequence:

C(0,n)={−1,1,1,1,−1,−1,−1,1,−1,1,1,−1,1,1,−1,1,−1,
    −1,−1,1,1,1,−1,−1,1,−1,1,1,1,1,1}

The above sequence C(0,n) can represent a base M-sequence. Cyclic shifted variations of the base M-sequence (e.g., see FIG. 4, infra) can be defined as C(k,n)=C(0,(n+k) mod N). Accordingly, length-63 scrambling codes can be obtained as:

[C(u,0),C(u,0), ... ,C(u,14),C(u,14),C(u,15),0,C(u,
    15),C(u,16),C(u,16), ... ,C(u,30),C(u,30)]

where 0 can be mapped to a DC tone of a frequency-based transmission. It should be appreciated that other length codes can be generated by setting suitable values for k and n for C(k,n) (e.g., k and n can have suitable values greater than 0). For the length-63 case, distinct scrambling codes can be generated by selecting distinct values of 'u'. Values of 'u' can be selected based on a desired number of scrambling code sequences for a set of such sequences. For instance, five, ten, twenty, etc., variations of the base M-sequence can be selected. For 31 possible sequences, 'u' can correspond to the set {0, . . . , 30}.

In at least one aspect, sequence module 312 can generate three scrambling sequences from the formula C(k,n)=C(0, (n+k) mod N). The scrambling codes can correspond to the following three values of 'u': {0, 10, 20}, thus utilizing the base M-sequence, a tenth cyclic shifted variation of the base sequence, and a twentieth cyclic shifted variation of the base sequence. The resulting three scrambling code sequences are:

C(0,n)={−1,1,1,1,−1,−1,−1,1,−1,1,1,−1,1,1,−1,1,−1,
    −1,−1,1,1,1,−1,−1,1,−1,1,1,1,1,1}

C(10,n)={−1,1,1,−1,1,−1,−1,−1,−1,1,1,1,−1,−1,1,−1,−1,1,
    1,1,1,1,1,−1,1,1,1,−1,−1,−1,1,1,−1,1,1}

C(20,n)={1,−1,−1,1,1,−1,−1,1,1,1,1,1,1,−1,1,1,1,1,−1,−1,
    −1,1,−1,1,1,−1,1,1,−1,1,1,−1,−1,−1,−1,1,1}

The foregoing scrambling sequences can be employed to generate scrambling codes of varying length (e.g., length-62 scrambling code) and combined with SSC sequences. Scrambled sequences are mapped into wireless transmissions, as discussed below. By employing scrambling sequences of a common polynomial expression, a significant reduction in interference among transmitted SSCs can be accomplished System 300 can further comprise a transmission processor 316. The transmission processor 316 can map an SSC onto components of an OTA message. Specifically, the SSC can be mapped onto sub-carrier channels of a frequency based message (e.g., FDM, OFDM, OFDMA), onto code divisions of a code based message (e.g., CDMA, CDMA-2000, wideband CDMA [WCDMA]), onto time divisions of a time based message (e.g., TDMA), or suitable sub-components of combined system messages (e.g., TD-CDMA, TD-SCDMA, UMTS-TDD, FDMA/TDMA/FDD, etc.). The OTA message can be received at mobile device 304, which can employ suitable techniques for decoding the message and the SSC. In at least one instance, the mobile device 304 can employ a substantially inverse process for decoding the SSC as SSC generator 302 employs for coding/scrambling the SSC. Instructions for decoding the SSC can be pre-loaded onto the mobile device 302, downloaded from a network patch or the like (e.g., a software and/or firmware patch at a service provider's network server), or included within the OTA message (e.g., in a message preamble, or the like).

As described, system 300 can provide substantial benefit for wireless communications. SSC scrambling codes generated from a common polynomial expression and indexed based on a corresponding PSC can result in reduced interference for SSCs transmitted by multiple base stations (306). Such a result can be of even greater benefit where large numbers of base stations (306) exist in a semi-planned or un-planned deployment, where interference can be high and signal to noise ratios (SNR) relatively low. Accordingly, system 300 can provide for increased efficiency and OTA reliability even for unfavorable wireless environments.

Figure 4:
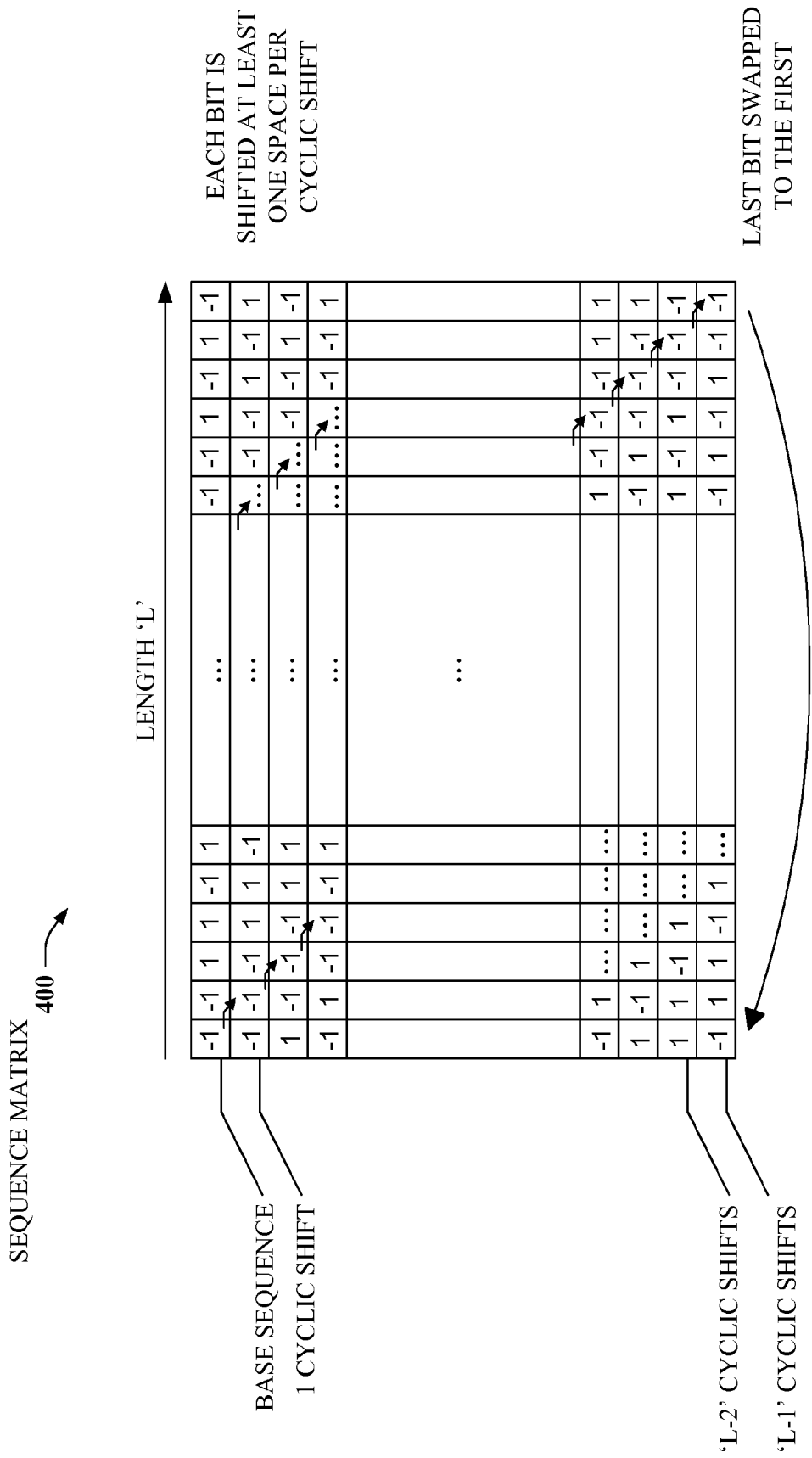

FIG. 4 illustrates an example sequence matrix 400 that can be utilized to generate synchronization codes and/or scrambling codes for various aspects described herein. Sequence matrix 400 comprises a number of sequences represented by rows of the matrix 400. The first (top) row of the matrix is a base sequence. Lower rows of the matrix are variations of the base sequence. As depicted in FIG. 4, the lower rows are cyclic shifted variations of the base sequence, although it should be appreciated that other suitable variations of a binary base sequence, known in the art, can be utilized to generate a similar sequence matrix to that depicted at 400. As depicted by the arrows in shown amongst the sequence matrix 400, the cyclic shift is a single digit shift whereby variations of the base sequence are formed by shifting each sequence bit one position, or one matrix column, as compared to a previous sequence. Thus, bit 1 for the base sequence is −1, and a first cyclic shifted variation of the base sequence, depicted at row 2 of the matrix, has the same −1 in the second bit (second column). Further, each bit of the base sequence is shifted into the next right-most column in the first cyclic shifted sequence. It should be appreciated that multiple cyclic shifts can be employed instead, such that each bit is shifted two columns, three columns, etc., with respect to previous sequences instead of a single column.

Additional rows of the matrix exhibit further shifts of the base sequence. Thus, bits of the second cyclic shifted sequence (row 3) are shifted two columns from the base sequence (row 1), and so on, throughout each row. For a matrix having 'L' columns, based on sequence lengths of 'L', the matrix can comprise at least 'L' unique sequences, including the base sequence and L−1 single cyclic shifted variations of the base sequence. Such a sequence can be employed to generate synchronization codes and/or scrambling codes as described herein. Where matches a desired code length, single sequences of the matrix 400 can be employed to create such codes. Alternatively, where is shorter than the desired code length, multiple sequences of the matrix 400 can be employed to create the code(s).

As an example to illustrate the foregoing, a desired code length (e.g., SSC length) is 62 bits. Where is equal to 62, a single sequence of the matrix 400 can be utilized to form a code. Where is equal to 31, sequence pairs of the matrix 400 can be interleaved to from the code. Where is equal to 21, a sequence triplet, with one of the sequences truncated by one bit, can be interleaved to generate the code. It should also be appreciated that substantially similar sequence lengths can be employed in conjunction with bit truncation and/or bit repetition (e.g., a length-63 M-sequence can be truncated by one bit to form the length-62 code, also length-30 or length-32 sequence pairs can be employed in conjunction with single bit repetition or truncation, respectively, to form the length-62 code, etc.).

For dense base station deployment, where dozens or hundreds of base stations operate at a common geographic site (e.g., see FIG. 1, supra), employing pairs, triplets, etc., of sequences of shorter length than a target code length can be beneficial. This is due to the fact that many more unique sequence pairs, triplets, etc., can be extracted from the sequence matrix 400 than single sequences. For instance, if is equal to 62, and a desired SSC length is 62 bits, 62 unique single sequences exist to form 62 distinct SSCs. However, where matrix 400 has 'L'=31, and for a length-62 SSC, there are 961 (31^2) sequence pairs that can form 961 different SSCs. As another example, for 'L=20' or 'L=21' (employing bit repetition or truncation) there are 8,000 or 9261, respectively, sequence triplet combinations that can generate different SSCs. Accordingly, by selecting an appropriate sequence length with respect to a desired SSC length, and employing pairs, triplets, etc., of sequences, a number of unique codes generated by a matrix (400) can be increased.

In at least one specific example of the claimed subject matter, matrix 400 is a square matrix having 31 M-sequences of length 'L' equal to 31. The base sequence is a binary sequence generated from a polynomial expression of the form x^5+x^2+1 over GF(2). Further, the additional sequences are single cyclic shifted variations of the base sequence (e.g., as depicted by the arrows of the sequence matrix 400). Pairs of sequences can be selected and interleaved to form various distinct SSC codes. As described elsewhere herein, SSC scrambling can be implemented in various ways (e.g., see FIG. 3, supra). In one example, the selected pairs can be interleaved to form length-62 sequences and then scrambled. Alternatively, the selected length-31 sequences can be scrambled and then interleaved to form the length-62 sequence. As yet another alternative, the base M-sequence can be scrambled, such that each cyclic shifted variation of the matrix 400 is also scrambled. Scrambled sequence pairs can then be selected and interleaved to form the length-62 SSC code. Optionally, a 0 bit can be added to the length-62 codes to form length-63 codes, where the 0 bit is mapped to a DC tone of a wireless transmission. Thus, a variety of mechanisms can be employed to reduce interference of overlapping wireless messages received at a device, providing improved reception and overall communication, as well as potentially reducing power at the receiving device (e.g., by avoiding repeat transmission).

Figure 5:
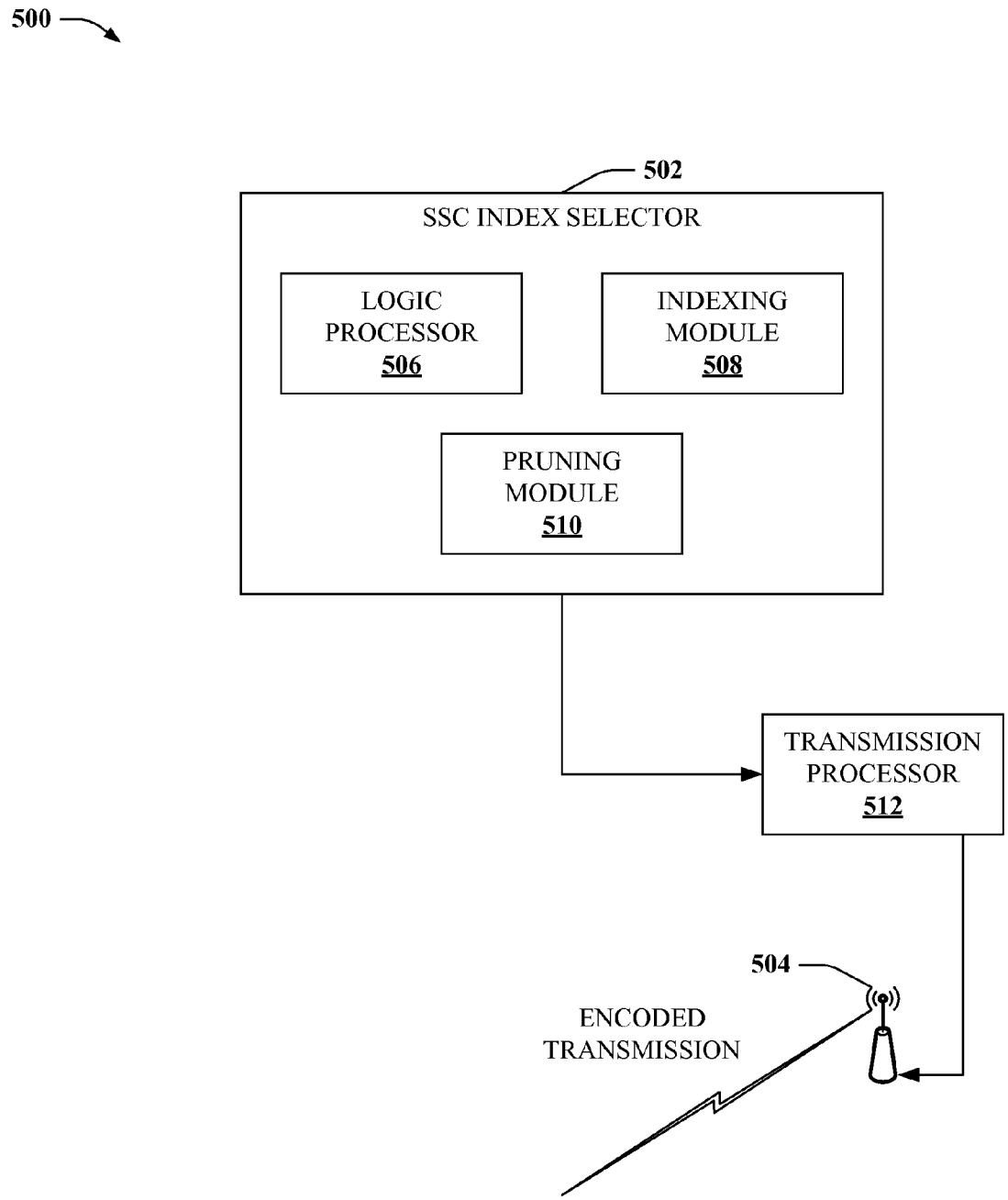
FIG. 5 depicts a block diagram of an example system that provides reduced interference for transmitted SSCs in a multi-transmitter mobile site.

FIG. 5 depicts a block diagram of an example system 500 that provides reduced interference for transmitted SSCs in a multi-transmitter mobile site. More specifically, system 500 provides a selective codebook for choosing sequence combinations for generating resulting SSCs. In some aspects, the sequence combinations can be based on underlying characteristics of a resulting SSC. Accordingly, improved wireless transmission can be accomplished by properly selecting SSCs that yield desirable traits in a mobile communication environment.

System 500 includes an SSC index selector 502 that identifies a sequence or group of sequences (e.g., sequence pair) for generating one or more SSCs that can be assigned to a base station 504 of a RAN (not depicted, but see FIG. 3, at 306). The SSC index selector 502 can comprise a logic processor 506 that forms a sequence matrix from which the sequence or group of sequences can be selected. The sequence matrix can be formed utilizing a base sequence and a number of variations of the base sequence. In at least one aspect, the base sequence is a binary M-sequence of length n+1, and the matrix comprises the base sequence and n cyclic shifted variations of the base sequence (e.g., as depicted at FIG. 4, supra). An indexing module 508 can assign indices to sequences and/or groups of sequences of the sequence matrix. Sequences/groups of sequences can be selected by reference to an assigned index. In at least one aspect of the subject disclosure, the index module assigns substantially $(n+1)^X$ indices, where x is a number of sequences in a group. Thus, for single sequences, substantially n+1 indices are assigned. For sequence pairs, substantially (n+1)^2 indices are assigned, and so on.

Where more distinct SSC sequence combinations exist than base stations (504) requiring an SSC, a pruning module 510 can select sequences/sequence groups based on characteristics of a resulting SSC. The characteristics can be based on results of a signal emulator, for instance, that can determine interference, power loss, cross-correlation, and like characteristics of an SSC. Sequences/sequence groups yielding SSCs with desirable characteristics, such as low PAPR, can be selected to generate SSCs.

As a particular example to illustrate aspects of system 500, logic processor 506 defines a sequence matrix having 31 length-31 sequences. Sequence pairs of the matrix can be represented by (u, v), where u and v both have values {0, . . . , 30}. A number of length-62 SSCs can be generated based on the sequence pairs (u,v) of the sequence matrix. Indexing module 508 assigns (n+1)^2, or 961, indices to the 961 distinct sequence pairs of the sequence matrix. An algorithm of the form r=u*31+v can be used to generate these indices. In one aspect of the example, pruning module 510 selects 170 of the 961 distinct indices based on characteristics of SSC signals comprised of the sequence pairs (e.g., including scrambling, such as provided by a common PSC-based scrambling code, and interleaving the sequences). One or more of the selected SSCs (e.g., a pair), can then be modulated by a transmission processor 512 (e.g., employing a modulator, signal coder, etc.) into a radio frame to resolve a frame boundary of the radio frame. As one particular aspect of the example, the following SSC indices r=u*31+v corresponding to a maximum PAPR of substantially 6.75 decibels (dB) can be employed:

| 16 | 18 | 20 | 33 | 62 | 63 | 66 | 70 | 71 | 75 | 80 | 83 | 93 |
|---|---|---|---|---|---|---|---|---|---|---|---|---|
| 99 | 104 | 105 | 113 | 116 | 121 | 125 | 126 | 140 | 153 | 168 | 169 | |
| 170 | 173 | 189 | 190 | 191 | 203 | 204 | 210 | 211 | 220 | 226 | 228 | |
| 233 | 236 | 241 | 251 | 261 | 267 | 268 | 270 | 278 | 287 | 293 | 300 | |
| 304 | 313 | 317 | 327 | 332 | 336 | 338 | 339 | 344 | 346 | 355 | 367 | |
| 377 | 379 | 388 | 395 | 399 | 401 | 417 | 418 | 419 | 422 | 424 | 426 | |
| 435 | 439 | 445 | 452 | 453 | 456 | 457 | 466 | 475 | 478 | 482 | 486 | |
| 488 | 493 | 498 | 508 | 515 | 516 | 517 | 518 | 531 | 533 | 534 | 543 | |
| 546 | 553 | 554 | 560 | 565 | 587 | 589 | 592 | 606 | 614 | 618 | 621 | |
| 623 | 625 | 628 | 631 | 636 | 645 | 653 | 665 | 677 | 678 | 684 | 700 | |
| 707 | 708 | 711 | 713 | 714 | 719 | 725 | 728 | 735 | 738 | 745 | 751 | |
| 752 | 755 | 765 | 770 | 777 | 781 | 789 | 797 | 801 | 802 | 810 | 816 | |
| 818 | 819 | 826 | 829 | 831 | 851 | 854 | 856 | 862 | 863 | 871 | 879 | |
| 889 | 897 | 901 | 909 | 910 | 913 | 916 | 917 | 930 | 938 | 940 | 946 | |
| 954 | | | | | | | | | | | | |

In another aspect of the example, pruning module 510 selects 340 of the 961 distinct indices, also based on characteristics of SSC signals comprised of the selected sequence pairs. Different tones derived from one or more of 340 resulting SSCs (e.g., different tones of a pair of SSCs) can be modulated by transmission processor 512 into the radio frame to resolve the frame boundary of the radio frame. In one specific aspect, the following SSC indices r=u*31+v can be employed that correspond to a maximum PAPR of substantially 7.18 dB:

| 2 | 5 | 6 | 7 | 11 | 14 | 17 | 18 | 20 | 23 | 27 | 30 | 33 |
|---|---|---|---|---|---|---|---|---|---|---|---|---|
| 37 | 39 | 41 | 43 | 44 | 47 | 50 | 53 | 60 | 61 | 63 | 65 | 66 |
| 68 | 70 | 71 | 74 | 75 | 80 | 84 | 86 | 88 | 99 | 101 | 102 | 104 |
| 105 | 107 | 111 | 113 | 114 | 115 | 116 | 121 | 125 | 126 | 137 | 140 | |
| 144 | 151 | 153 | 155 | 158 | 168 | 169 | 170 | 173 | 183 | 187 | 189 | |
| 190 | 191 | 197 | 203 | 204 | 205 | 209 | 210 | 211 | 212 | 217 | 219 | |
| 220 | 225 | 226 | 227 | 228 | 233 | 236 | 238 | 240 | 241 | 257 | 259 | |
| 261 | 263 | 266 | 267 | 268 | 270 | 271 | 276 | 277 | 278 | 285 | 286 | |
| 290 | 292 | 293 | 294 | 300 | 303 | 304 | 306 | 307 | 310 | 311 | 312 | |
| 313 | 316 | 317 | 327 | 331 | 332 | 336 | 338 | 339 | 341 | 342 | 344 | |
| 346 | 347 | 353 | 359 | 360 | 362 | 363 | 365 | 372 | 373 | 374 | 377 | |
| 379 | 382 | 383 | 388 | 394 | 399 | 401 | 406 | 413 | 417 | 418 | 419 | |
| 420 | 421 | 422 | 424 | 426 | 430 | 439 | 442 | 445 | 446 | 450 | 452 | |
| 453 | 454 | 456 | 457 | 463 | 466 | 475 | 478 | 482 | 483 | 485 | 486 | |
| 492 | 493 | 494 | 495 | 498 | 499 | 505 | 506 | 508 | 513 | 515 | 516 | |
| 517 | 518 | 519 | 527 | 528 | 531 | 533 | 534 | 539 | 543 | 549 | 550 | |
| 553 | 554 | 560 | 565 | 569 | 570 | 571 | 572 | 573 | 579 | 583 | 587 | |
| 588 | 589 | 590 | 592 | 594 | 596 | 603 | 606 | 607 | 609 | 610 | 614 | |
| 620 | 621 | 625 | 630 | 631 | 634 | 636 | 637 | 642 | 645 | 646 | 653 | |
| 657 | 659 | 661 | 664 | 668 | 675 | 677 | 678 | 679 | 681 | 682 | 684 | |
| 686 | 690 | 694 | 699 | 700 | 702 | 707 | 708 | 709 | 720 | 725 | 726 | |
| 728 | 732 | 733 | 735 | 738 | 739 | 740 | 741 | 747 | 751 | 752 | 753 | |
| 755 | 760 | 764 | 767 | 770 | 772 | 773 | 780 | 781 | 782 | 785 | 787 | |
| 789 | 791 | 795 | 797 | 801 | 802 | 805 | 810 | 811 | 815 | 818 | 819 | |
| 821 | 823 | 825 | 826 | 830 | 831 | 838 | 842 | 845 | 846 | 851 | 853 | |
| 854 | 856 | 862 | 863 | 868 | 871 | 875 | 876 | 878 | 879 | 881 | 889 | |
| 891 | 892 | 897 | 901 | 906 | 907 | 909 | 910 | 913 | 916 | 917 | 918 | |
| 919 | 925 | 930 | 935 | 936 | 940 | 942 | 943 | 944 | 951 | 954 | 957 | |
| 959 | | | | | | | | | | | | |

In yet another example for selecting code indices, 170, 340, or another suitable number of indices can be selected based on minimizing a number of overlapping code indices used in a single SSC. For example, a first set of length-31 sequences 'u' can employ indices {0, 1, 2, . . . , 19}. A second set of length-31 sequences 'v' can employ indices {11, 13, 14, . . . , 30} such that overlap between 'u' and 'v' sequences of resulting SSCs are minimized. Reduced index overlap can, in some instances, provide reduced interference between transmitted codes.

As described, system 500 can provide an SSC codebook that selects SSCs based on underlying characteristics of the transmitted synchronization signal. Such a result can lead to improved signal reception for terminal devices in a mobile environment, a decrease in repetitive traffic (e.g., fewer data retransmission requests), and lower power consumption for such terminals. Accordingly, substantial benefits can be provided by system 500 for a mobile communication environment.

Figure 6:
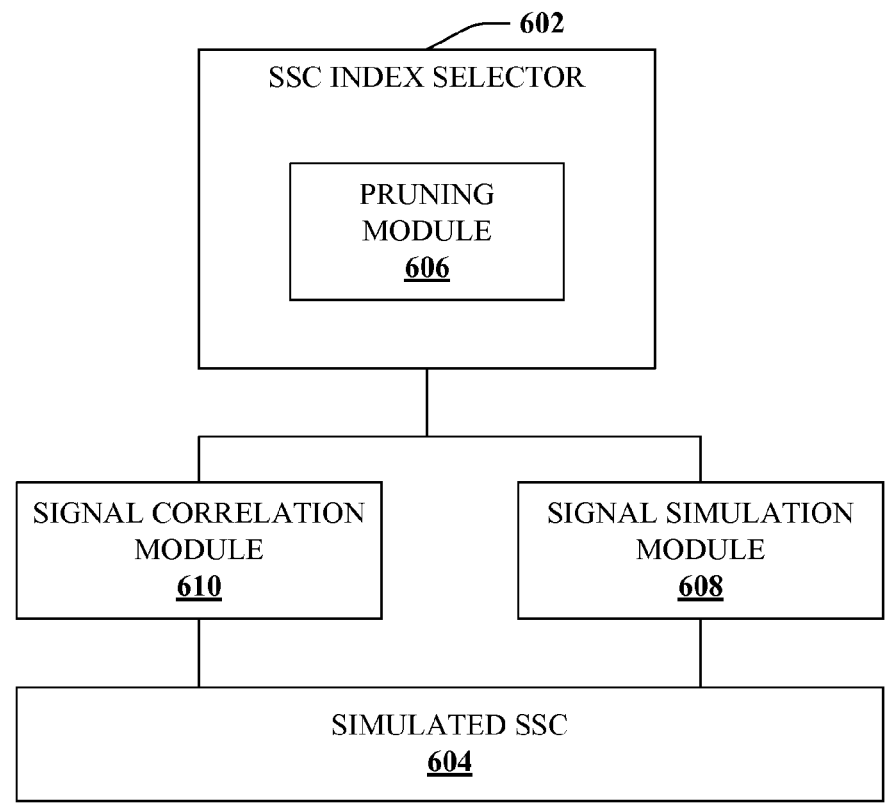
FIG. 6 illustrates a block diagram of an example system that employs an SSC codebook described herein for reducing interference between SSC transmissions.

FIG. 6 illustrates a block diagram of an example system 600 that employs an SSC codebook as described herein for reducing interference between SSC transmissions. Selection of SSC codes can be based on comparison of transmission power and/or cross-correlation characteristics of a simulated SSC and one or more thresholds. Resulting SSC(s) can be modulated into a wireless transmission (e.g., a radio frame) to resolve a frame boundary of the transmission. Because SSC selection is based on underlying SSC characteristics, improved power and/or correlation characteristics can be provided by system 600 for mobile communications.

System 600 comprises an SSC index selector 602 that indexes sequences or groups of sequences of a sequence matrix. The index selector can select one or more indices based on power and/or cross-correlation characteristics of a simulated SSC code 604 that results from a particular sequence(s) identified by an index. Determined power and/or cross-correlation characteristics can be qualified based on comparison to one or more thresholds. For instance, pruning module 606 can condition selection of a particular index based on comparison of SSC PAPR to a PAPR threshold (e.g., based on a nominal OFDM symbol), comparison of SSC cross-correlation to a cross-correlation threshold, or both. Thus, resulting SSCs can be generated that have predetermined quality characteristics.

System 600 can employ a signal simulation module 608 to determine PAPR of simulated SSCs (604) resulting from a sequence(s) identified by a particular index. Signal simulation module 608 can compare the determined PAPR to a threshold PAPR, and forward the results to pruning module 606. A relatively low PAPR is typically beneficial (e.g., as compared with transmission of typical frequency-modulated signals) for wireless transmission, resulting in negligible impact on downlink transmissions in many instances. Thus, the threshold can typically specify some maximum acceptable PAPR, an acceptable range within a desired PAPR (e.g., within 3 dB of the desired PAPR), a number of SSCs below the desired PAPR (e.g., 30 SSCs having PAPR values below the desired PAPR), or the like, or a suitable combination thereof.

System 600 can also employ a signal correlation module 610 that determines a cross-correlation factor of simulated SSCs (604) resulting from a sequence(s) identified by a particular index. Signal correlation module 610 can compare a determined cross-correlation to a cross-correlation threshold to qualify the simulated SSC 604. Signals strongly correlated with other signals can often exhibit high interference, thus minimal cross-correlation can be desired. Accordingly, pruning module 606 can condition selection of a particular sequence index based at least in part on cross-correlation being equal or lower than the threshold correlation. In some aspects, pruning module 606 can condition selection of a particular sequence index on a combination of PAPR results and cross-correlation results. For instance, if a simulated SSC (604) has a PAPR lower than a threshold PAPR and correlation lower than a correlation threshold, an index associated with the simulated SSC (604) can be selected. As described, system 600 provides a convenient mechanism for selecting indices of a sequence matrix in order to provide beneficial PAPR and/or low cross-correlation characteristics, resulting in improved wireless transmission and reliability in many instances.

Figure 7:
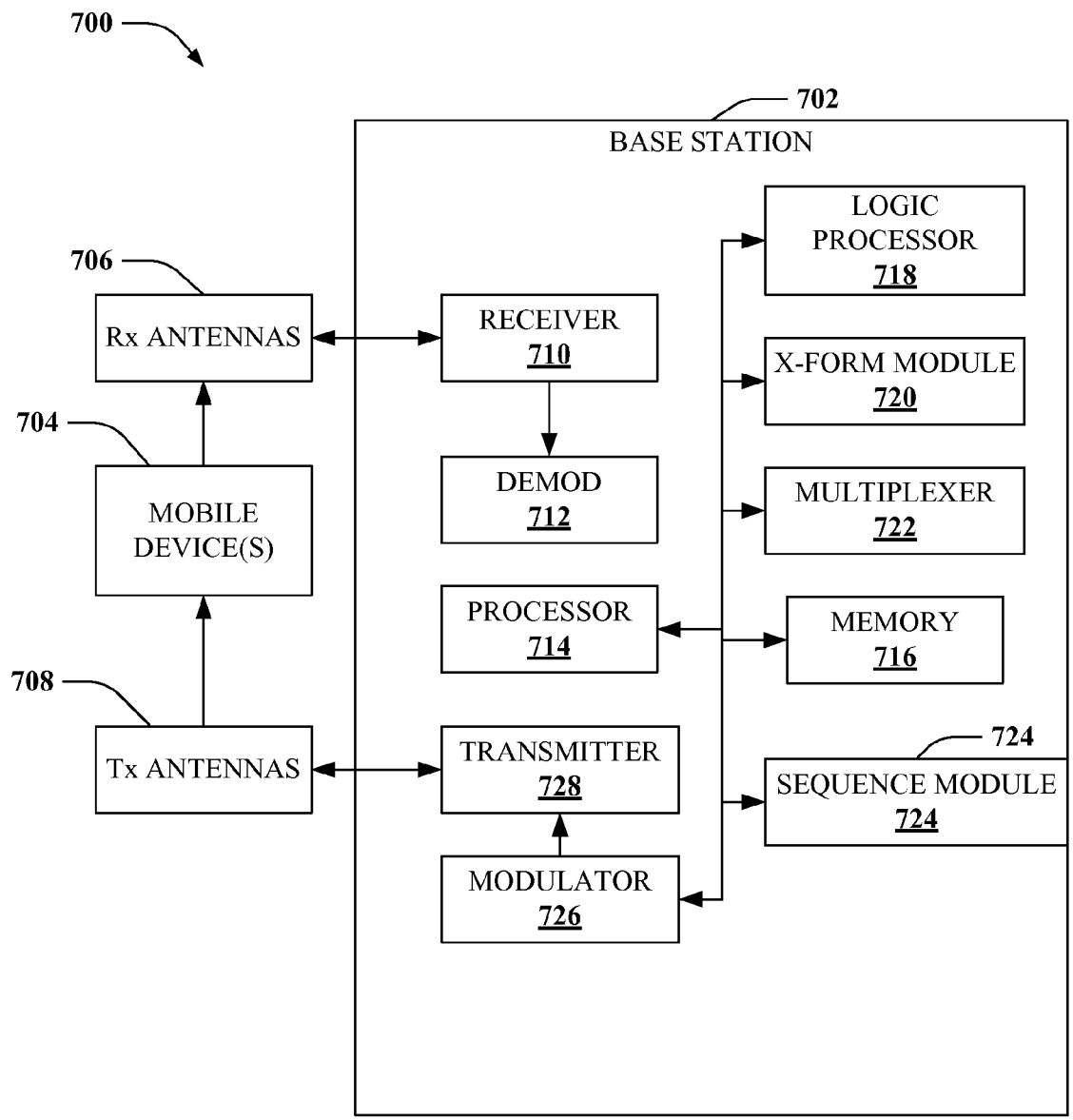
FIG. 7 depicts a block diagram of an example base station according to aspects of the subject disclosure.

FIG. 7 depicts a block diagram of an example system 700 comprising a base station 702 and one or more mobile devices 704 according to aspects of the subject disclosure. In at least one aspect of the subject disclosure, base station 702 can determine suitable SSC codes and/or scrambling codes to reduce interference of transmitted synchronization information. Specifically, various mechanisms for generating and scrambling SSCs, generating scrambling codes (e.g., based on three length-31 M-sequences) for such SSCs, and selecting sequence indices based on characteristics of such SSCs can be accomplished by base station 702. Accordingly, system 700 facilitates improved mobile communication by providing improved transmission characteristics for OTA messages received at one or more mobile devices 704 in a mobile communication environment.

System 700 comprises a base station 702 (e.g., access point, . . . ) with a receiver 710 that receives signal(s) from one or more mobile devices 704 through a plurality of receive antennas 706, and a transmitter 728 that transmits to the one or more mobile devices 704 through a transmit antenna(s) 708. Receiver 710 can receive information from receive antennas 706 and can further comprise a signal recipient (not shown) that receives uplink data synchronized in accordance with a PSC and/or SSC provided by base station 702. Additionally, receiver 710 is operatively associated with a demodulator 712 that demodulates received information. Demodulated symbols are analyzed by a processor 714 that is coupled to a memory 716 that stores information related to generating a sequence matrix to provide synchronization and/or scrambling codes, as well as selecting, scrambling and/or multiplexing such sequences to form the SSCs, selecting sequences according to an SSC codebook as described herein, known in the art or made known to one of skill in the art by way of the context provided herein, and/or any other suitable information related to performing the various actions and functions set forth herein.

Processor 714 is further coupled to a logic processor 718 that can generate a sequence matrix from at least a base M-sequence and cyclic shifted variations of such sequence (e.g., n cyclic shifted variations). The processor 714 can be further coupled to a data transformation module 720 that can scramble various sequences of the sequence matrix provided by the logic processor 718. For instance, the data transformation module 720 can employ a common binary scrambling code based on a PSC associated with a wireless communication to scramble at least one such sequence pertinent to an SSC, as described herein.

Additionally, the processor 714 can be coupled to a multiplexing module 722 that can generate an SSC based on at least one scrambled sequence provided by the data transformation module 720. For instance, where the data transformation module 720 scrambles a base sequence of a sequence matrix, any suitable cyclic shifted variation of the scrambled base sequence, and/or the scrambled base sequence itself, can be utilized by the multiplexing module 722 to form the SSC. The SSC can be formed by interleaving two or more sequences, repetition of one or more sequences, addition/truncation of bits, or the like, as required.

Processor 714 can further be associated with a sequence module 724. Sequence module 724 can generate the scrambling code from one or more sequences provided by the logic processor 718 (e.g., based on a common polynomial expression that is different from an expression used to generate SSC-related sequences). In one example, the sequence module 724 can generate three suitable M-sequences, either length-63 or length-31, to form the scrambling code(s). The three M-sequences can be generated from a base M-sequence and cyclic shifted variations of the base M-sequence, for example. Further, in at least some aspects, at least 20 cyclic shifted variations of the base M-sequence can be created, and the three M-sequences can comprise the base M-sequence, a tenth cyclic shifted variation, and a twentieth cyclic-shifted variation. It should be appreciated, however, that other variations of the base sequence can be employed, and other selected members of the set of variations can be utilized for the three (or, e.g., other suitable number) of scrambling code sequences.

Base station 702 can further comprise a modulator 726 that can map an SSC to an OTA message transmitted by transmitter 728. In one aspect, the SSC can be mapped onto some or all sub-carrier channels of an OFDM transmission. The OTA message can be sent via the transmission antennas 708 to mobile device 704. It should be appreciated that base station 702 can be part of a planned, semi-planned or unplanned deployment of several base stations (not depicted) operating in a common area. Generation, scrambling and assignment of SSCs can be implemented by base station 702 in a predetermined manner specified by logic processor 718, and sequence module 724, or other instructions stored in memory 716 and executed by processor 714 pertinent to multi-base station operation. In the alternative, base station 702 can communicate with other nearby base stations over a backhaul network (not depicted) to coordinate assignment of SSCs to various base stations of a cell site. In at least one other alternative, code assignments can be specified at least in part by a centralized entity (not depicted, but see FIG. 3, supra) and provided to base station 702. Accordingly, system 700 can function as part of a RAN comprising multiple base stations.

Figure 8:
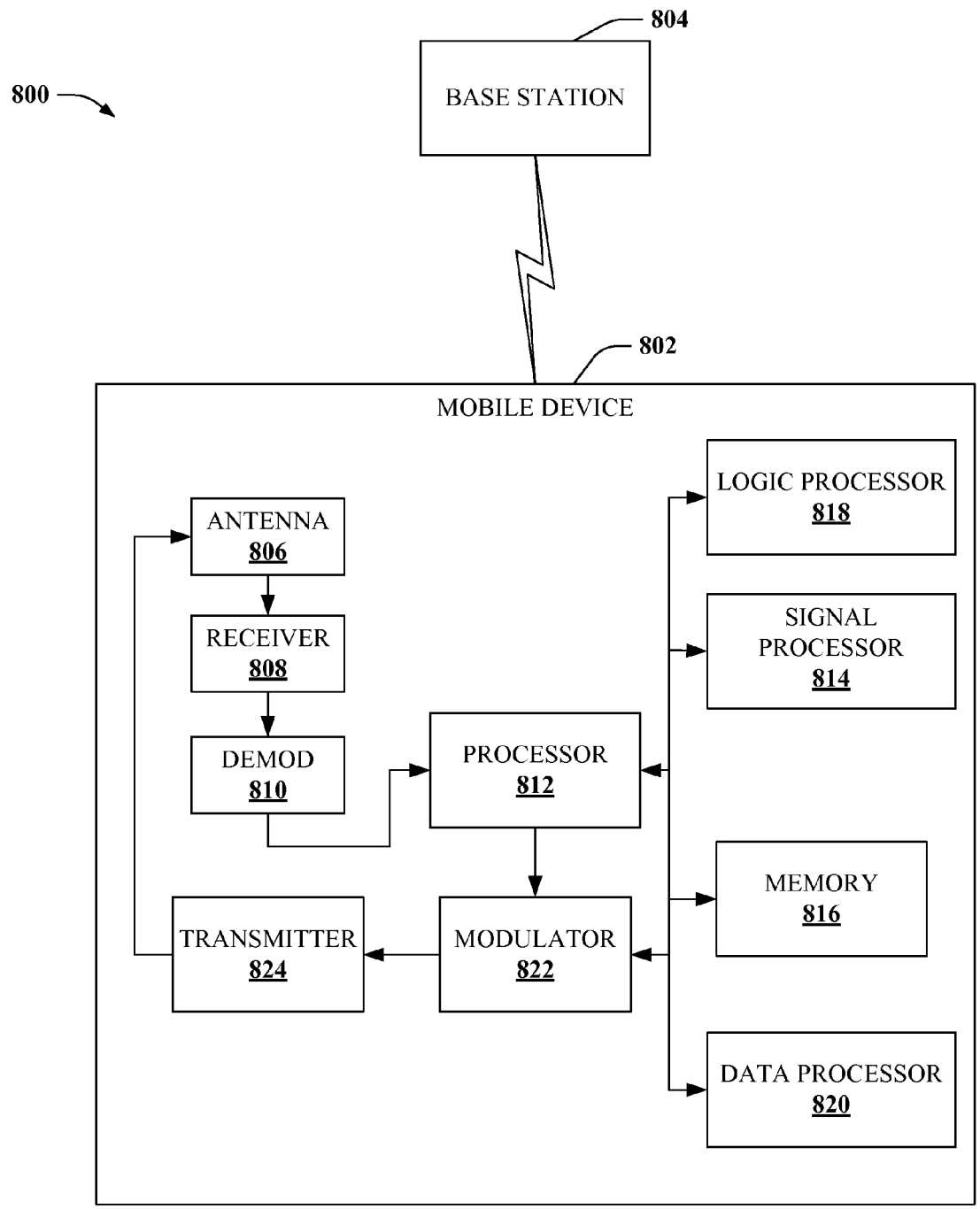
FIG. 8 illustrates a block diagram of an example terminal device according to still other aspects of the subject disclosure.

FIG. 8 illustrates a block diagram of an example system 800 that comprises a mobile device 802. Mobile device 802 can be configured to receive and decode synchronization information within an OTA message transmitted by a base station 804. Decoding processes at the mobile device 802 can be inverse to similar processes employed by the base station 804. Instructions for receiving and decoding the message can be pre-loaded at the mobile device 802, included at least in part within the OTA message, obtained by way of a software/firmware patch (e.g., over a network, or connection to a computing device), or a combination thereof or of the like.

Mobile handset 802 includes at least one antenna 806 (e.g., a transmission receiver or group of such receivers comprising an input interface) that receives a signal (e.g., comprising synchronization information pertinent to facilitating remote wireless communication) and a receiver 808, which performs typical actions (e.g., filters, amplifies, down-converts, etc.) on the received signal. Specifically, antenna 806 and transmitter 830 (collectively referred to as a transceiver) can be configured to facilitate wireless data exchange with base station 804.

Antenna 806 and receiver 808 can also be coupled with a demodulator 810 that can demodulate received symbols and provide them to a processor 812 for evaluation. Specifically, demodulator 810 can extract at least synchronization information from received wireless transmissions. For frequency-based transmission, for instance, the demodulator 810 can extract the synchronization information from sub-carrier frequencies of the wireless transmissions. In one aspect, the synchronization information can comprise at least an SSC further comprised of at least two sequences scrambled with a common PSC-based binary scrambling code. A signal processor 814 can employ a common PSC-based binary descrambling code to decipher the at least two sequences comprising the received SSC. The descrambling code can be substantially equivalent to the scrambling code employed by the base station 804, or can be a counterpart thereof (e.g., an inverted scrambling code). In at least one aspect, decoding the synchronization information involves a data processor 820 that applies a first reverse cyclic shift to a first of the two sequences associated with the SSC and a second reverse cyclic shift to a second of the two sequences. In such aspect(s), the signal processor 814 can then apply the descrambling code to the shifted first sequence and shifted second sequence to decipher the SSC.

Once the received SSC is decoded, a logic processor 818 can extract identification information pertinent to a device (804) that transmitted the received data. Such information can be utilized to further decode received data (e.g., payload information) and/or facilitate communication with the transmitting device (804).

It should be appreciated that processor 812 can control and/or reference one or more components (806, 808, 810, 816, 822) of the mobile handset 802. Further, processor 812 can execute one or more modules, applications, engines, or the like (814, 818, 820) that comprise information or controls pertinent to executing functions of the mobile device 802. For instance, such functions can include receiving data from a remote source (804), decoding the received data based on a particular descrambling code, identifying a mobile network transmitter (804) associated with the deciphered code, or the like, as described above.

Mobile handset 802 can additionally include memory 816 that is operatively coupled to processor 812. Memory 816 can store data to be transmitted, received, and the like. Further, memory 816 can store the modules, applications, engines, etc. (814, 818, 820) executed by processor 812, above.

Mobile handset 802 can still further comprise a modulator 822, and a transmitter 824 that transmits generated signals (e.g., by processor 812 and modulator 822) to, for instance, base station 804, an access point, another access terminal, a remote agent, etc. As described, system 800 provides a mobile device 802 that can facilitate receiving coded synchronization information provided by a base station 804 and decipher the coded information to facilitate wireless communication between such devices (802, 804). Because the synchronization information can be encoded based on a selected SSC codebook and/or based on certain scrambling codes, reduced interference and improved reliability and reduced power consumption at the mobile device 802 can potentially be accomplished.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include SSC generator 108, pruning module 510 and transmission processor 512, or a different combination of these and other components. Sub-components could also be implemented as components communicatively coupled to other components rather than included within parent components. Additionally, it should be noted that one or more components could be combined into a single component providing aggregate functionality. For instance, signal simulation module 608 can include signal correlation module 610, or vice versa, to facilitate determining peak to average power and cross correlation of an SSC by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 9:
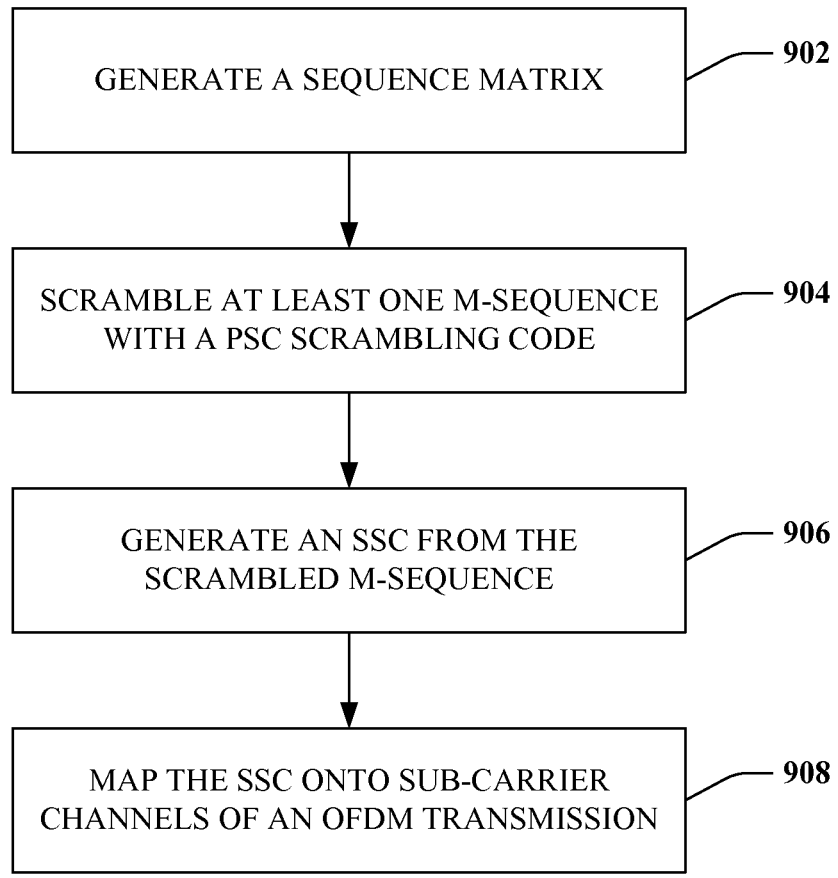
FIG. 9 depicts a flowchart of an example methodology for reducing interference of multiple SSC transmissions according to aspects of the subject disclosure.
Figure 10:
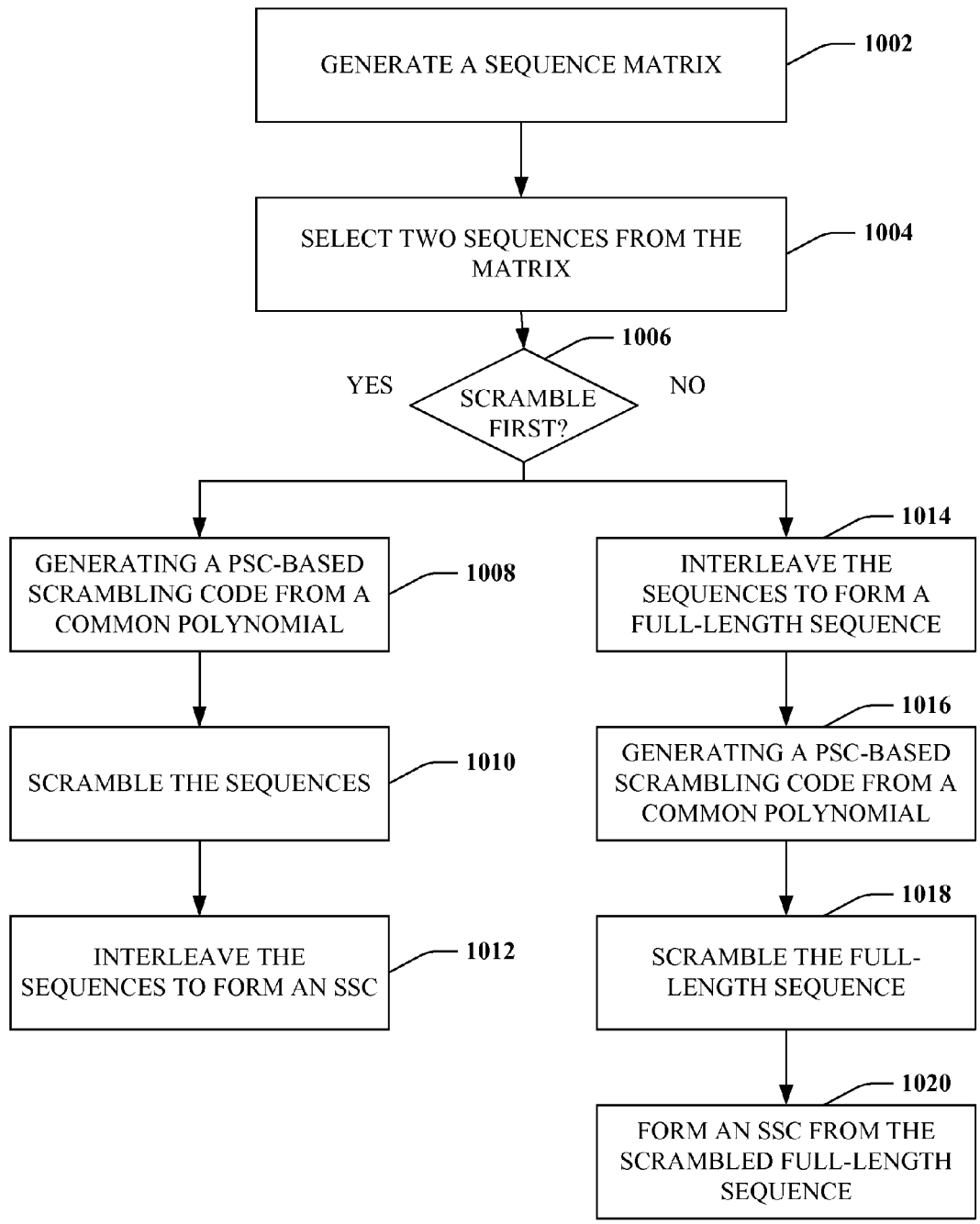
FIG. 10 depicts a flowchart of a sample methodology for scrambling OTA SSC transmission according to one or more aspects.
Figure 11:
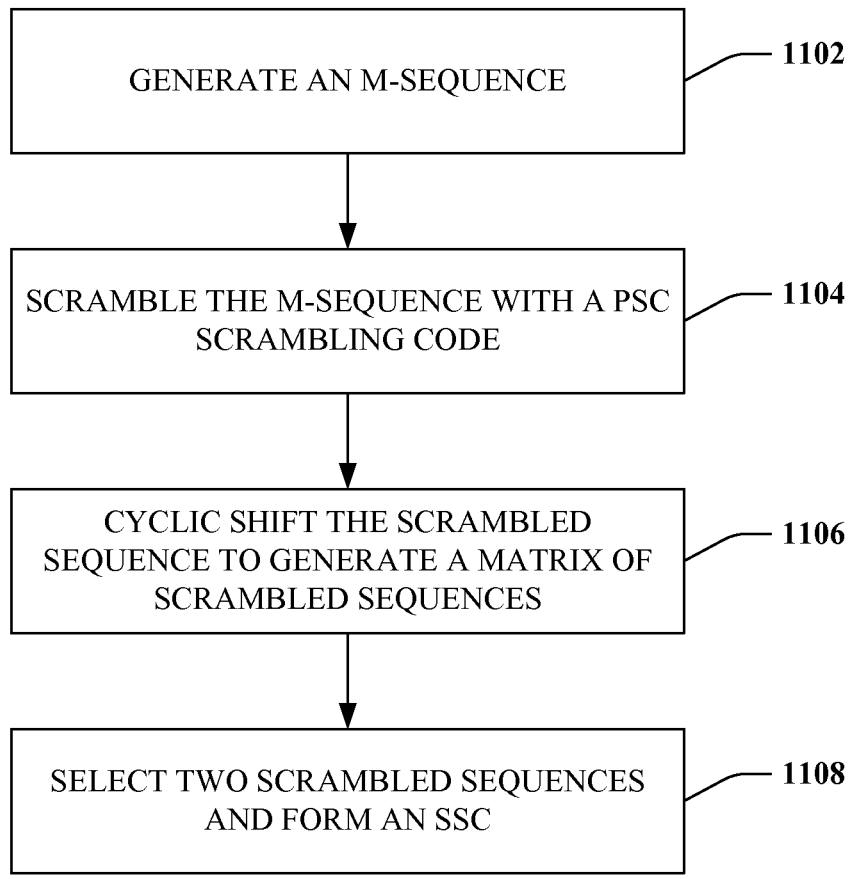
FIG. 11 illustrates a flowchart of a sample methodology for generating scrambled SSCs according to at least one aspect.

In view of the exemplary systems described supra, methodologies that may be implemented in accordance with the disclosed subject matter will be better appreciated with reference to the flow charts of FIGS. 9-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

FIG. 9 depicts a flowchart of an example methodology 900 for reducing interference of multiple SSC transmissions according to aspects of the subject disclosure. Method 900, at 902, can generate a sequence matrix. The sequence matrix can comprise M-sequences generated from one or more polynomial expressions. In at least one aspect of the subject disclosure, the M-sequences are generated from a polynomial expression of the form $x^5+x^2+1$ over GF(2). Additionally, the M-sequences can comprise a base sequence and various variations of the base sequence, such as provided by cyclic shifting the base sequence.

At 904, method 900 can scramble at least one M-sequence with a PSC-based scrambling code associated with a wireless communication. The scrambling code can be generated, for instance, based on sequences identified by indices associated with the PSC. In one aspect, the at least one M-sequence scrambled with the scrambling code can comprise a pair of sequences that are multiplexed to form an SSC. The pair of M-sequences can be scrambled prior to or after such multiplexing. In another aspect, the base M-sequence of the above sequence matrix can be the at least one M-sequence scrambled at reference number 904, such that each variation of the scrambled base M-sequence is also scrambled. Accordingly, the sequence matrix comprises scrambled sequences according to such aspect.

At 906, method 900 can generate an SSC based on the scrambled M-sequence. As indicated above, the SSC can be generated by multiplexing multiple sequences (e.g., sequence pairs, sequence triplets), truncating one or more bits of such sequences, repeating one or more bits of such sequences, or a combination thereof or of the like, as required to generate an SSC of a desired length (e.g., length-62). At 908, method 900 can map the SSC onto sub-components of an OTA message (e.g., sub-carrier channels of an OFDM transmission).

An SSC scrambled with a PSC-based scrambling code, generated by method 900, can provide improved interference characteristics for wireless communication. It should be appreciated that the scrambling code can be generated from the same polynomial utilized to generate the SSC, or a polynomial different than that utilized to generate the SSC. In at least one aspect, the polynomial utilized to generate the scrambling code is of the form $1+x^2+x^3+x^4+x^5$. Further, such polynomial can be utilized to generate a base scrambling sequence. Cyclic shifted variations of the base scrambling sequence can be generated to provide a scrambling sequence matrix. In one specific aspect of the subject disclosure, twenty or more cyclic shifted variations of the scrambling sequence are generated and combined with the base scrambling sequence to form the scrambling sequence matrix. According to such aspects, the scrambling code can be generated from substantially three sequences of the scrambling sequence matrix. As an example, the base scrambling sequence, a tenth cyclic shifted variation of the base scrambling sequence, and a twentieth cyclic shifted variation of the base scrambling sequence can be utilized to generate the PSC-based scrambling code.

FIG. 10 depicts a flowchart of a sample methodology 1000 for scrambling OTA SSC transmission according to one or more aspects. Method 1000, at 1002, can generate a sequence matrix as described herein. At 1004, method 1000 can select two sequences from the matrix to generate an SSC. The sequences can be selected based on characteristics of an SSC code resulting from the selected sequences. According to one specific example, the characteristics can comprise a PAPR of the SSC code, a cross-correlation factor of the SSC code, or a suitable combination thereof At 1006, method 1000 can determine whether the sequences are first scrambled or multiplexed. Such determination can be based on projected interference characteristics of resulting SSC codes, optionally in conjunction with prevailing wireless transmission characteristics of a RAN (e.g., multi-path scattering, signal reflection/refraction, or the like, as known in the art of radio frequency propagation and/or mobile communication technology). If the sequences are first multiplexed, method 1000 can proceed to 1014, if the sequences are first scrambled, method 1000 can proceed to 1008.

At 1008, method 1000 can generate a PSC-based scrambling code from a sequence matrix generated from one or more polynomial expressions, as described herein (e.g., see methodology 900, supra). At 1010, the two sequences selected from the sequence matrix can be scrambled utilizing the PSC-based scrambling code. At 1012, the sequences can then be interleaved to form an SSC. The SSC can be mapped to an OTA message and transmitted in conjunction with one or more wireless communications.

At 1014, method 1000 can interleave the two sequences selected from the sequence matrix to form a full-length sequence. At 1016, a full-length scrambling code can be generated as described herein. At 1018, the full-length sequence can be scrambled by employing the scrambling code generated at reference number 1016. Finally, at 1018, an SSC can be generated from the scrambled interleaved sequences, which can be mapped to the OTA message discussed above.

FIG. 11 illustrates a flowchart of a sample methodology 1100 for generating scrambled SSCs according to at least one aspect. At 1102, method 1100 can generate an M-sequence from a polynomial expression. The polynomial expression can, in some instances, have the form $x^5+x^2+1$ over GF(2). At 1104, method 1100 can scramble the M-sequence with a PSC-based scrambling code. The PSC-based scrambling code can be generated from one or more scrambling sequences obtained from one or more scrambling polynomial expressions. According to at least one aspect, the scrambling polynomial expressions can comprise a single expression of the form $1+x^2+x^3+x^4+x^5$.

At 1106, the scrambled M-sequence is cyclic shifted n times to create n distinct scrambled variations of the scrambled M-sequence. The scrambled M-sequence and n distinct scrambled variations can be compiled into a scrambled sequence matrix. At 1108, two of the scrambled sequences of the scrambled sequence matrix are selected to form an SSC. The selected sequences can be multiplexed to form a full-length scrambled sequence, as described herein. It should be appreciated that the two selected sequences can be based on underlying characteristics of an SSC derived from the sequences. In one aspect, the underlying characteristic comprises a PAPR of the SSC as compared with a PAPR threshold. In another aspect, the underlying characteristic comprises a cross-correlation factor as compared with a correlation threshold. In yet another aspect, the underlying characteristic comprises a suitable combination of the foregoing.

In at least one further aspect, the two selected sequences can be based on a predetermined number of desired SSCs. As a particular example, where the scrambled sequence matrix comprises 31 scrambled sequences of length substantially one half the length of a desired SSC code, 170 or 340 sequence pairs can be selected, based on the PAPR and/or cross-correlation characteristics, discussed above. Selection of SSC sequence pairs in such a manner can provide reduced interference for transmitted synchronization information, potentially reducing power consumption of receiving devices and improving overall communication quality in a mobile communication environment. Accordingly, method 1100 can provide a significant benefit for various mobile communication technologies, as described herein.

Figure 12:
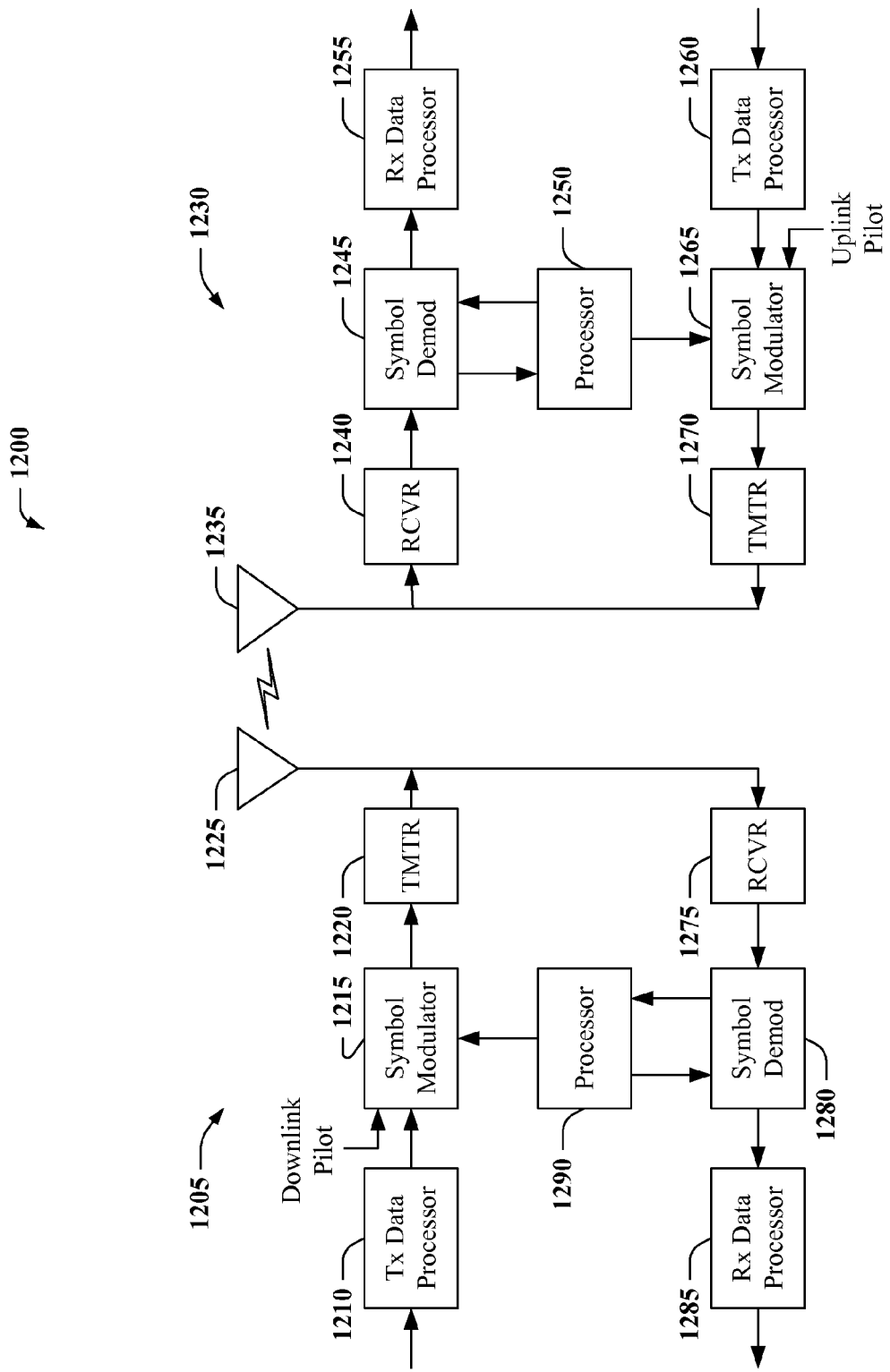
FIG. 12 depicts a block diagram of an example system that can facilitate remote communication according to some aspects disclosed herein.

FIG. 12 depicts a block diagram of an example system 1200 that can facilitate wireless communication according to some aspects disclosed herein. On a downlink, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. A symbol modulator 1220 multiplexes data and pilot symbols and provides them to a transmitter unit (TMTR) 1220. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof.

TMTR 1220 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1225 to the terminals. At terminal 1230, an antenna 1235 receives the downlink signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 demodulates and provides received pilot symbols to a processor 1250 for channel estimation. Symbol demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the uplink, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an uplink signal, which is transmitted by the antenna 1235 to the access point 1205. Specifically, the uplink signal can be in accordance with SC-FDMA requirements and can include frequency hopping mechanisms as described herein.

At access point 1205, the uplink signal from terminal 1230 is received by the antenna 1225 and processed by a receiver unit 1275 to obtain samples. A symbol demodulator 1280 then processes the samples and provides received pilot symbols and data symbol estimates for the uplink. An RX data processor 1285 processes the data symbol estimates to recover the traffic data transmitted by terminal 1230. A processor 1290 performs channel estimation for each active terminal transmitting on the uplink. Multiple terminals can transmit pilot concurrently on the uplink on their respective assigned sets of pilot subbands, where the pilot subband sets can be interlaced.

Processors 1290 and 1250 direct (e.g., control, coordinate, manage, etc.) operation at access point 1205 and terminal 1230, respectively. Respective processors 1290 and 1250 can be associated with memory units (not shown) that store program codes and data. Processors 1290 and 1250 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot subbands can be shared among different terminals. The channel estimation techniques can be used in cases where the pilot subbands for each terminal span the entire operating band (possibly except for the band edges). Such a pilot subband structure would be desirable to obtain frequency diversity for each terminal The techniques described herein can be implemented by various means. For example, these techniques can be implemented in hardware, software, or a combination thereof For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof With software, implementation can be through modules (e.g., procedures, functions, and so on) that perform the functions described herein. The software codes can be stored in memory unit and executed by the processors 1290 and 1250.

Figure 13:
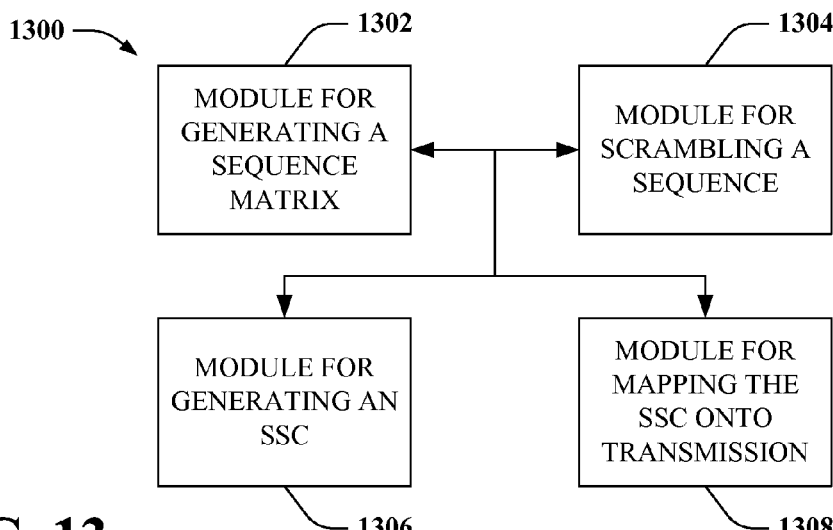
FIG. 13 depicts a block diagram of an example system that provides reduced interference for a mobile communication environment.
Figure 14:
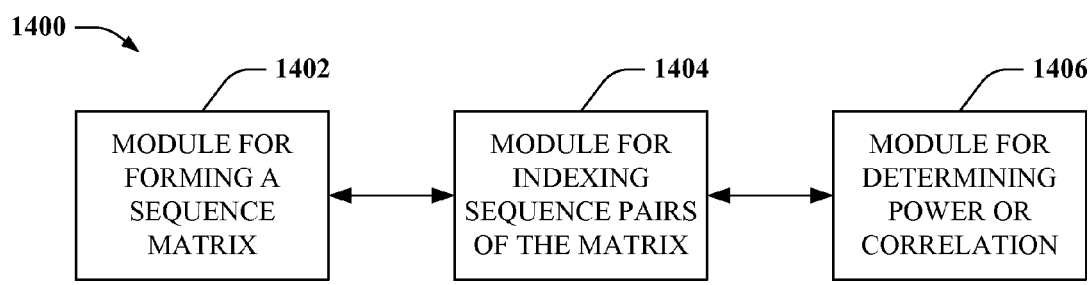
FIG. 14 depicts a block diagram of a sample system that selects SSC sequences based on PAPR and/or correlation of resulting SSC signals.
Figure 15:
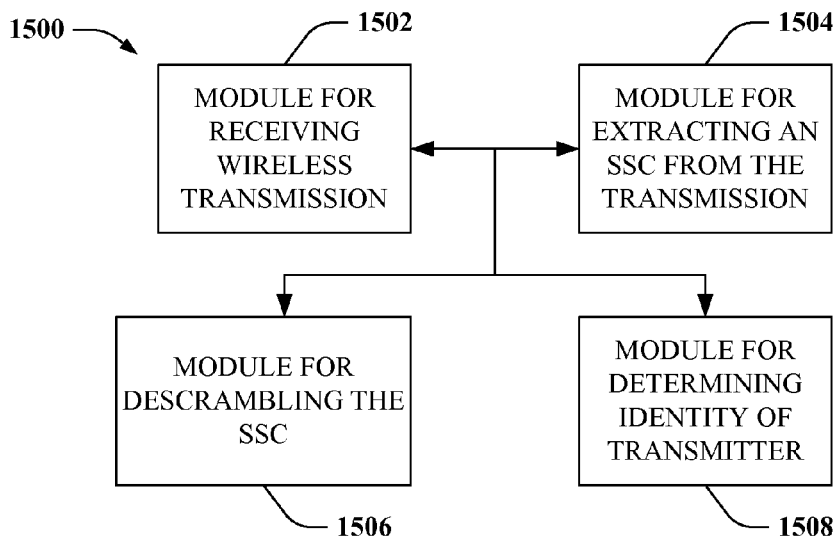
FIG. 15 illustrates a block diagram of a sample system that provides improved reception and synchronization in a multi-transmitter mobile environment.

FIGS. 13, 14, and 15 provide block diagrams of example systems 1300, 1400, 1500 for implementing various aspects of the subject disclosure. System 1300 can comprise a module 1302 for generating a sequence matrix from a base M-sequence and cyclic shifted variations of the base M-sequence. The base M-sequence can be generated from a polynomial expression, as described herein. Bits of each cyclic shifted variation of the base sequence can be either single shifted, double shifted bits, triple shifted bits, etc., or a suitable combination thereof The base sequence and the shifted variations can be utilized by the module 1302 to form the sequence matrix.

System 1300 can also include a module 1304 for scrambling one or more of the M-sequences. The module 1304 can employ a scrambling code, such as a PSC-based scrambling code to scramble the M-sequences. The scrambling code can be generated by creating a base scrambling sequence from a polynomial expression (e.g., different from that used to generate the sequence matrix), as described herein. Cyclic shifted variations of the base scrambling sequence can be generated, and one or more of the base scrambling sequence and shifted variations can be utilized to generate the scrambling code.

A module 1306 for generating an SSC can create the SSC utilizing at least one scrambled M-sequence. For instance, the scrambled M-sequence(s) can be interleaved, truncated, repeated, or a combination thereof or of the like, as suitable depending on a length of the at least one scrambled M-sequence compared with a desired length of the SSC. System 1300 can further comprise a module 1308 for mapping the SSC onto an OTA transmission. For instance, bits of the SSC can be mapped to sub-carrier channels of an OFDM transmission, code sub-divisions of a CDMA transmission, time sub-divisions of a TDMA transmission, or suitable combinations of integrated systems. As described, system 1300 can generate scrambled SSC codes exhibiting reduced interference in a mobile communication environment.

System 1400 can comprise a module 1402 for forming a sequence matrix from a base M-sequence and n cyclic shifted variations of the base M-sequence, as described herein. Further, system 1400 can comprise a module 1404 for indexing sequence pairs of the sequence matrix. The module can generate at least $(n+1)^2$ indices for each distinct sequence pair of the sequence matrix. Furthermore, system 1400 can comprise a module 1406 for determining PAPR and/or correlation of SSC codes resulting from sequence pairs. The module 1406 can select a predetermined number of sequence pairs (e.g., substantially 170 sequence pairs, substantially 340 sequence pairs, or other suitable number based at least in part on a number of base stations in a mobile site etc.) meeting PAPR and/or cross-correlation thresholds (e.g., below a desired PAPR and/or below a desired correlation factor). Accordingly, SSCs resulting from the selected sequence pairs can have desired transmission characteristics resulting in improved wireless transmission.

System 1500 can comprise a module 1502 for receiving wireless transmissions. The module 1502 can receive one or more wireless OTA transmissions from a mobile network transmitter (e.g., base station(s)). The module 1502 can comprise one or more wireless antenna's (e.g., radio antenna), a receiver for pre-conditioning received signals, or the like. System 1500 can further comprise a module 1504 for extracting an SSC from transmissions received by module 1502. Extraction can be based on signal demodulation, conditioning, and the like, as known in the art. A module 1506 for descrambling the SSC can employ a common PSC-based binary descrambling code to decipher the SSC. In one aspect, the descrambling code can be substantially similar to a scrambling code used to scramble the SSC, or a variation (e.g., by inverting the bits of the scrambling code) of such scrambling code. Additionally, system 1500 can comprise a module 1508 for determining an identity of the mobile network transmitter from the deciphered SSC. For instance, a transmitter ID encoded into the SSC can be read and cross-referenced with an ID stored in memory. The transmitter ID can be utilized, for instance, to facilitate wireless communication between a mobile device and the mobile network transmitter. Where received signals exhibit reduced interference, system 1500 can provide reduced power consumption and improved communication reliability in a mobile communication environment.

What is claimed is:

1. A method of selecting distinct secondary synchronization codes (SSCs) for a radio network site, comprising:
    forming a sequence matrix from a base M-sequence and n cyclic shifted sequences of the base M-sequence;
    assigning one of substantially $(n+1)^2$ indices to distinct sequence pairs of the sequence matrix;
    selecting a sequence pair, wherein selecting the sequence pair comprises generating an SSC based on the sequence pair and determining power or signal correlation characteristics of the SSC, and wherein the sequence pair is selected based at least in part on the power or signal correlation characteristics of the SSC resulting from the sequence pair;
    determining a peak to average power radio (PAPR) of the SSC resulting from the sequence pair and comparing the PAPR to a threshold; and
    mapping, by a base station, the SSC resulting from the sequence pair onto components of an over-the-air message.

2. The method of claim 1, wherein the sequence matrix has 31 length-31 sequences and n equals 30, and either 170 or 340 indexed sequence pairs among 961 indexed sequence pairs are selected based on the power or signal correlation characteristics of the SSC resulting from the sequence pair, and further comprising generating a distinct SSC from each sequence pair, and assigning two or more distinct SSCs to base stations of the radio network site.

3. The method of claim 1, further comprising employing length-31 sequences for the base M-sequence and the n cyclic shifted sequences.

4. The method of claim 1, further comprising employing an algorithm of the form r=u*n+v to generate the substantially $(n+1)^2$ indices, where r is an integer from 0 to $(n+1)^2$ and u and v are sequences each selected from the set $\{0, \ldots n\}$.

5. The method of claim 1, further comprising conditioning selecting the sequence pair in part on the comparison of the PAPR and the threshold.

6. The method of claim 1, further comprising determining a cross-correlation factor of the SSC resulting from the sequence pair and comparing the factor to a threshold.

7. The method of claim 6, further comprising conditioning selecting the sequence pair in part on the comparison of the factor and the threshold.

8. The method of claim 1, further comprising determining a cross-correlation factor and a peak to average power ratio (PAPR) of the SSC, and comparing the cross-correlation factor to a correlation threshold and comparing the PAPR to power threshold.

9. The method of claim 8, further comprising conditioning selecting the sequence pair in part on the PAPR being lower than the power threshold and the cross-correlation factor being lower than the correlation threshold.

10. An apparatus configured to select distinct secondary synchronization codes (SSCs) for a radio network site, comprising:
    a logic processor that forms a sequence matrix from a base M-sequence and n cyclic shifted sequences of the base M-sequence;
    an indexing module that assigns one of substantially $(n+1)^2$ indices to distinct sequence pairs of the sequence matrix;
    a pruning module that selects a sequence pair, wherein selecting the sequence pair comprises generating as SSC based on the sequence pair and determining a peak to average power ratio (PAPR) or signal correlation of the SSC resulting from the sequence pair, and wherein the pruning module selects the sequence pair based at least in part on the PAPR or signal correlation of the SSC resulting from the sequence pair, compared with a threshold power or signal correlation, respectively; and a transmission processor configured to map the SSC resulting from the sequence pair onto components of an over-the-air message.

11. The apparatus of claim 10, wherein the sequence matrix has 31 length-31 sequences and n equals 30, and the pruning module is configured to select either 170 or 340 indexed sequence pairs among 961 indexed sequence pairs based on the PAPR or signal correlation of the SSC resulting from the sequence pair, generate a distinct SSC from each sequence pair, and assign one or more distinct SSCs to base stations of the radio network site.

12. The apparatus of claim 10, wherein the logic processor employs length-31 sequences for the base M-sequence and the n cyclic shifted sequences.

13. The apparatus of claim 10, wherein the indexing module employs an algorithm of the form $r=u*n+v$ to generate the substantially $(n+1)^2$ indices, where r is an integer from 0 to $(n+1)^2$ and u and v are sequences each selected from the set $\{0, \ldots n\}$.

14. The apparatus of claim 10, further comprising a signal simulation module configured to determine the PAPR of the SSC resulting from the sequence pair and compare the PAPR to a threshold.

15. The apparatus of claim 14, wherein the pruning module is configured to condition selecting the sequence pair in part on the comparison of the PAPR and the threshold.

16. The apparatus of claim 10, further comprising a signal correlation module configured to determine a cross-correlation factor of the SSC resulting from the sequence pair and compare the factor to a threshold.

17. The apparatus of claim 16, wherein the pruning module is configured to condition selecting the sequence pair in part on the comparison of the factor and the threshold.

18. The apparatus of claim 10, further comprising a signal correlation module configured to determine a cross-correlation factor of the SSC and compare the cross-correlation factor to a correlation threshold and a measurement module configured to determine the PAPR of the SSC and compare the PAPR to a power threshold.

19. The apparatus of claim 18, wherein the pruning module is configured to condition selecting the sequence pair in part on the PAPR being lower than the power threshold and the cross-correlation factor being lower than the correlation threshold.

20. An apparatus configured to select distinct secondary synchronization codes (SSCs) for a radio network site, comprising:

means for forming a sequence matrix from a base M-sequence and n cyclic shifted sequence of the base M-sequence;

means for assigning one of substantially $(n+1)^2$ indices to distinct sequence pairs of the sequence matrix;

means for selecting a sequence pair, wherein the means for selecting the sequence pair comprises means for generating an SSC based on the sequence pair and means for determining a power or signal correlation of a scrambled SSC, and wherein the sequence pair is selected based at least in part on the power or signal correlation of the scrambled SSC resulting from the sequence pair;

means for determining a peak to average power ratio (PAPR) of the SSC resulting from the sequence pair and comparing the PAPR to a threshold;

means for scrambling the selected sequence pair with a primary synchronization code (PSC)-based scrambling code; and means for mapping, by a base station, the SSC resulting from sequence pair onto components of an over-the-air message.

21. A non-transitory computer-readable medium, comprising:

computer-readable instructions configured to select distinct secondary synchronization codes (SSCs) for a radio network site, wherein the instructions are executable by at least one processor to:

form a sequence matrix from a base M-sequence and n cyclic shifted sequences of the base M-sequence;

assign one of substantially $(n+1)^2$ indices to distinct sequence pairs of the sequence matrix;

select a sequence pair, wherein selecting the sequence pair comprises generating an SSC based on the sequence pair and determining a power or signal correlation of a scrambled SSC resulting from the sequence pair, and wherein the sequence pair is selected based at least in part on the power or signal correlation of the scrambled SSC resulting from the sequence pair;

determine a peak to average power ratio (PAPR) of the SSC resulting from the sequence pair and comparing the PAPR to a threshold;

scramble the selected sequence pair with a primary synchronization code (PSC)-based scrambling code; and map, by a base station, the SSC resulting from the sequence pair onto components of an over-the-air message.

* * * * *